(12) United States Patent
Tiedemann, Jr.

(10) Patent No.: US 7,009,953 B2
(45) Date of Patent: *Mar. 7, 2006

(54) METHOD AND SYSTEM FOR CHANGING FORWARD TRAFFIC CHANNEL POWER ALLOCATION DURING SOFT HANDOFF

(75) Inventor: Edward G. Tiedemann, Jr., San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 953 days.

This patent is subject to a terminal disclaimer.

(21) Appl. No.: 09/882,430

(22) Filed: Jun. 14, 2001

(65) Prior Publication Data

US 2001/0030948 A1    Oct. 18, 2001

Related U.S. Application Data

(63) Continuation of application No. 08/925,518, filed on Sep. 8, 1997, now Pat. No. 6,307,849.

(51) Int. Cl.
*H04Q 7/00* (2006.01)
*H04B 7/216* (2006.01)

(52) U.S. Cl. .................. 370/332; 370/335; 455/436
(58) Field of Classification Search ................ 370/335, 370/342, 331–333; 455/436–444
See application file for complete search history.

(56) References Cited

U.S. PATENT DOCUMENTS

| 4,222,115 A | 9/1980 | Cooper et al. |
| 4,901,307 A | 2/1990 | Gilhousen et al. |
| 5,093,840 A | 3/1992 | Schilling |
| 5,101,501 A | 3/1992 | Gilhousen et al. |
| 5,128,965 A | 7/1992 | Henriksson |
| 5,179,571 A | 1/1993 | Schilling |
| 5,245,629 A | 9/1993 | Hall |
| 5,257,283 A | 10/1993 | Gilhousen et al. |
| 5,265,119 A | 11/1993 | Gilhousen et al. |
| 5,267,261 A | 11/1993 | Blakeney, II et al. |
| 5,267,262 A | 11/1993 | Wheatley, III |
| 5,305,468 A | 4/1994 | Bruckert et al. |
| 5,465,399 A | 11/1995 | Oberholtzer et al. |
| 5,640,414 A | 6/1997 | Blakeney, II et al. |
| 5,771,451 A | 6/1998 | Takai et al. |
| 5,845,208 A | 12/1998 | Hottinen et al. |
| 5,878,350 A | 3/1999 | Nakamura et al. |
| 5,884,187 A | 3/1999 | Ziv et al. |
| 5,893,035 A | 4/1999 | Chen |
| 5,898,682 A | 4/1999 | Kanai |
| 5,920,549 A | 7/1999 | Bruckert et al. |
| 5,933,782 A | 8/1999 | Nakano et al. |

(Continued)

FOREIGN PATENT DOCUMENTS

EP    0556551 A2    4/1993

*Primary Examiner*—Steven Nguyen
(74) *Attorney, Agent, or Firm*—Philip R. Wadsworth; Thien T. Nguyen; S. Hossain Beladi

(57) ABSTRACT

A system and method for adjusting forward traffic channel power allocation in a communications system, wherein signal qualities of pilot channels respectively transmitted by multiple base stations in an active set of a mobile station, are measured by the mobile station, compared to a signal quality standard, and the comparison results reported to a system controller, thereby to indicate which of the pilots at the mobile station surpass the standard. The system controller then adjusts the forward channel power allocation based on the comparison results.

10 Claims, 12 Drawing Sheets

U.S. PATENT DOCUMENTS

| | | |
|---|---|---|
| 6,038,448 A | 3/2000 | Chheda et al. |
| 6,055,428 A | 4/2000 | Soliman |
| 6,073,021 A | 6/2000 | Kumar et al. |
| 6,160,999 A * | 12/2000 | Chheda et al. .............. 455/436 |
| 6,307,849 B1 * | 10/2001 | Tiedemann, Jr. ............ 370/332 |

* cited by examiner

| $I_1$ | $I_2$ | $I_3$ | $U^1$ | $U^2$ | $U^3$ | $U^4$ | $U^5$ | $U^6$ | $H^m$ |

FIG. 6A

| $I_1$ | $I_2$ | $I_3$ | $U^2$ | $U^3$ | $U^4$ | $U^5$ | $U^6$ | $H^m$ |

FIG. 6B

| $I_1$ | $I_2$ | $I_3$ | $J_1$ | $J_2$ | $J_3$ | $K_1$ | $K_2$ | $K_3$ | $H^m$ |

FIG. 6C

METHOD AND SYSTEM FOR CHANGING FORWARD TRAFFIC CHANNEL POWER ALLOCATION DURING SOFT HANDOFF

This application is a continuation of U.S. patent application Ser. No. 08/925,518, entitled Method and Apparatus for Changing Forward Traffic Channel Power Allocation, filed Sep. 8, 1997 now U.S. Pat. No. 6,307,849.

BACKGROUND OF THE INVENTION

I. Field of the Invention

The present invention relates to cellular communications systems and more particularly to methods and an apparatus for changing forward traffic channel power allocation in a code division multiple access (CDMA) cellular communications system.

II. Discussion of the Background

In a CDMA cellular telecommunications system, a common frequency band is typically used for communicating from a mobile to a set of base stations, and another common frequency band is typically used to communicate to the mobile from the set of base stations. In other instances, a common set of frequency bands may be used to conduct communications. A primary benefit of transmitting multiple communications over a common frequency band is an increase in the capacity of the cellular telephone system. The IS-95 standard, promulgated by the Telecommunications Industry Association (TIA), is an example of a highly efficient CDMA over-the-air interface that can be used for implementing a cellular telephone system.

The set of communications conducted over the same bandwidth in a CDMA cellular telecommunications systems are separated and distinguished from one another by modulating and demodulating the data transmitted using pseudo-random noise (PN) codes known to both the receive and transmit systems. The other communications appear as background noise during the processing of any particular communication. Because the other communications appear as background noise, CDMA protocols such as IS-95 often employ extensive transmit power control in order to use the available bandwidth more efficiently. The transmit power control keeps the transmit power of each communication near the minimum necessary in order to conduct communications successfully. Such transmit power control facilitates the processing of any particular communication by reducing the level of background noise generated by the other communications.

Another benefit of having base stations transmit to mobiles on the same frequency band, and of having mobiles transmit to base station on a second frequency band, is that "soft handoff" may be used to transition a mobile from the coverage area of a first base station to the coverage area of a second base station. Soft handoff is the process of simultaneously interfacing a mobile with two or more base stations. Soft handoff can be contrasted with hard handoff during which the interface with the first base station is terminated before the interface with the second base station is established.

As one might expect, soft handoff is generally more robust than hard handoff because as least one connection is maintained at all times. Methods and systems for conducting soft handoff in a CDMA cellular telephone system are disclosed in U.S. Pat. No. 5,101,501, filed Nov. 7, 1989, entitled "Method and System for Providing a Soft Handoff and Communications in a CDMA Cellular Telephone System", and U.S. Pat. No. 5,267,261, entitled "Mobile Station Assisted Soft Handoff in a CDMA Cellular Communication System", both assigned to the assignee of the present invention and incorporated herein by reference.

In accordance with the soft handoff procedure described in the above referenced patents, each base station transmits a respective pilot channel that is used by the mobiles to obtain initial system synchronization and provide robust time, frequency and phase tracking of the cell-site transmitted signals. The pilot channel transmitted by each base station uses a common spreading code (i.e., pseudo-noise sequence) but uses a different code phase offset so that the mobile can distinguish the pilot channels transmitted from the respective base stations.

During a soft handoff, two or more base stations transmit the same forward link data to the mobile. The mobile receives the signals from the set of base stations and combines them. A method and apparatus for performing such combining is described in U.S. Pat. No. 5,109,390, filed Nov. 7, 1989, entitled "Diversity Receiver in a CDMA Cellular Telephone System", assigned to the assignee of the present invention and incorporated herein by reference, discloses a diversity combining method for use in a CDMA cellular telephone system.

While soft handoff provides a more robust connection, in some instances soft handoff also has a negative effect on the overall capacity of the CDMA cellular telephone system. This is because the multiple forward link transmissions generated during a soft handoff may increase the total transmit power used to conduct the corresponding communication. This increased transmit power increases the total background noise generated by the system, which in turn may decrease overall system capacity.

Whether soft handoff increases or decreases system capacity is typically dependent on the environment the mobile is experiencing during soft handoff. If the mobile is experiencing a fading environment, the increased diversity provided by soft handoff is generally beneficial to system performance because the signals generally fade independently. When the mobile is in a non-fading environment, however, the diversity of data source is typically redundant. Therefore, for non-fading environments the benefit provided by increased diversity of signal source typically does not justify the overall increase in transmit power caused by soft handoff.

Thus, the present invention is directed to improving the performance of a CDMA telecommunications system by optimizing the configuration of a CDMA communications system during a soft handoff, in a multicarrier environment, or both in response to the environment in which the communications are being conducted.

SUMMARY OF THE INVENTION

Accordingly, one object of this invention is to provide a novel method for reducing a total amount of forward traffic channel power transmitted to a mobile during soft handoff.

Another object of the invention is to provide a system that implements the aforementioned method.

Another object of the invention is to determine the environment in which the mobile is operating during soft handoff, and optimize the configuration of the soft handoff in response to that determination.

The invention is equally applicable to a multi-carrier forward link.

Accordingly, one object of this invention is to provide a novel method for reducing a total amount of forward traffic channel power transmitted to a mobile with a multi-carrier forward link.

Another object of the invention is to provide a system that implements the aforementioned method.

Another object of the invention is to determine the environment in which the mobile is operating, and optimize the configuration of the multi-carrier forward link in response to that determination.

The present invention is applicable to systems which employ both soft handoff and a multi-carrier forward link.

The present invention provides a novel method and system where a mobile frequently sends a bit-vector message to a system controller indicating quantified, measured signal qualities (e.g., signal to interference ratios) of pilots from each base station in an "active set" of pilot channels tracked by the mobile. The mobile generates the bit-vector message by monitoring the respective signal qualities of the pilots, comparing the respective pilot channel qualities against a standard, and transmitting the bit-vector message to the respective base stations in the mobile's active set, which then forwards the information in the bit-vector message to a system controller. In response, the system controller issues a command to the base stations in the mobile's active set, adjusting selected ones of the respective code channel powers of the base stations in accordance with the respective pilot channel qualities reported in the bit-vector message generated by the mobile.

Because the forward traffic channel includes the respective code channels of the base stations in the mobile's active set, reducing the transmit powers of the respective code channels reduces the transmitted power of the forward traffic channel. Accordingly, the total capacity of the CDMA communication system increases as a result of radiating the minimum required forward traffic channel power necessary for proper reception at the mobile. By rapidly communicating to the system controller the observed pilot channel qualities, the CDMA system is capable of rapidly re-optimizing system resources in response to environmental changes to maximize system communications capacity.

In an alternative embodiment of the invention which employs a multicarrier link, the mobile station sends a bit for every carrier, or alternatively a bit for every antenna. Additionally, the base station adjusts the power on each carrier independently.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 6A is a diagram of a first data structure for the bit-vector message indicative of pilot channel quality;

FIG. 6B is a diagram of a second data structure for the bit-vector message indicative of pilot channel quality;

FIG. 6C is a diagram of a third data structure for the bit-vector message indicative of pilot channel quality;

DESCRIPTION OF THE PREFERRED EMBODIMENTS

Figure 1:
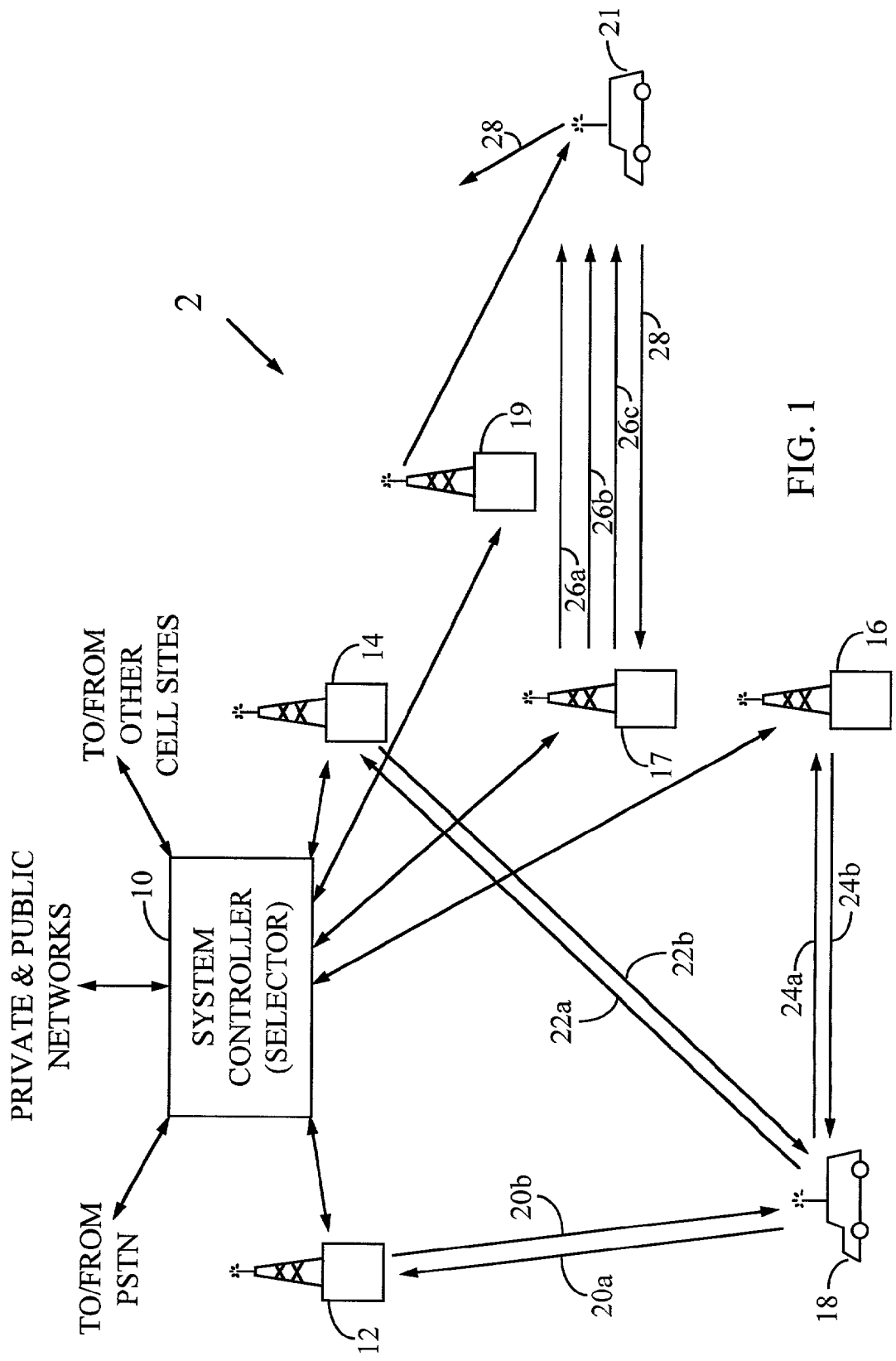
FIG. 1 is a block diagram of an exemplary CDMA cellular telephone system in accordance with the present invention.

Referring now to the drawings, wherein like reference numerals designate identical or corresponding parts throughout the several views, and more particularly to FIG. 1 thereof, there is illustrated a communication system 2 which is preferably a cellular telephone system, although equally applicable in a public branch exchange (PBX), personal communication services (PCS) system, satellite based communications system, indoor wireless network or outdoor wireless network. The system 2 uses code division multiple access (CDMA) modulation and demodulation techniques in communications between system resources. A system controller (selector) 10, commonly referred to as mobile telephone switching office (MTSO), includes interface and processing circuitry for providing system control to a set of base stations 12, 14, 16, 17 and 19. The system controller 10 also controls routing of telephone calls from a public switched telephone network (PSTN) to the appropriate base stations 12, 14, 16, 17 and 19 for transmission to the appropriate destination. A connection to or from the PSTN may be wireless, optical fiber, or "wired" communication (e.g., twisted pair or coaxial cable). The system controller 10 communicates with private and public networks which include data networks, multimedia networks, and other private and public communication entities. Furthermore, system controller 10 communicates to and from other base stations which are not shown in FIG. 1.

The system controller 10 communicates with the base stations 12, 14, 16, 17 and 19 by various means such as dedicated telephone lines, optical fiber links, coaxial links, or by radio frequency (RF) communication links. The base stations 12, 14 and 16 communicate with other systems such as mobile station ("mobile") 18 via single carrier wireless CDMA communications. Base stations 17 and 19 communicate with other systems such as mobile 21 via a multi-carrier link comprised of three CDMA signals illustrated by arrows 26a~c. Mobile 21 communicates with base stations 17 and 19 via single carrier reverse link 28. It should be noted that a multicarrier forward link may consist of more than three carriers or it may consist of less than three carriers. FIG. 1 also illustrates a multicarrier and a more conventional single carrier direct spread system coexisting in the same system. It should be noted that while this is possible, it is preferable that a system use only a single type for forward link.

Arrows 20a and 20b illustrate the respective reverse and forward links between the base station 12 and the mobile station 18. Arrows 22a and 22b illustrate the reverse and forward links between the base station 14 and the mobile station 18. Similarly, arrows 24a and 24b illustrate the possible reverse and forward links between the base station 16 and the mobile station 18. While crosslinks between the respective base stations 12, 14, 16 are not shown in FIG. 1, or a direct or radio frequency connection from controller 10 to the mobile 18, such possibilities are included within the inventive aspects of the present invention.

Base stations 12, 14, and 16 each transmit traffic data via a Walsh code channel to the mobile 18 on the communication forward links 20b, 22b, and 24b, when the system controller 10 assigns base stations 12, 14, and 16 to the mobile's active set and instructs the respective base stations to establish an interface with that mobile 18. The code channel allocated for communication with a mobile 18 is also referred to as a traffic channel. Each of the code channels transmitted from different base stations to the mobile contains redundant information and is available to the mobile 18 to combine the respective code channels using a diversity combining mechanism (explained in more detail herein). To increase the forward link rate to a mobile, multiple code channels may be used from the same base station. In this case, the aggregation of code channels is called the traffic channel. The forward link signal includes the aggregation of the code channels including the set of traffic channels and the additional control channels such as the pilot, synchronization and paging channels. The present invention reduces the transmit power of the forward link signal by reducing the time the traffic channels are active during a soft handoff.

Base stations 12, 14 and 16 also respectively transmit pilot channel to the mobile 18 along forward communication links 20b, 22b and 24b. The pilot channels are distinguished from the traffic channels transmitted from the same base station by different Walsh codes. The respective pilot channels from different base stations are distinguished from one another by pilot PN code shifts. In the absence of blockage or fading, the pilot channel received at the mobile 18 from the base station 16 would expect to be larger in received signal power than that of base stations 12 or 14 because the mobile 18 is closest to the base station 16.

Alternatively, in lieu of a separate code channel (Walsh code) for the pilot, the pilot can be embedded or multiplexed into the traffic channel streams which are sent to individual mobile stations. The embedding can be done by using special pilot symbols, or an auxiliary signal. When the embedded pilot is used, there is typically a common pilot which is used for initial acquisition of the system and for detecting when to handoff. Alternatively, separate pilots can be transmitted on a per traffic channel basis or per group of traffic channels.

When the mobile 18 is in a soft handoff region (e.g., when moving from a coverage region of at least one base station to at least one other base station) the system controller 10 dispatches a handoff direction message that includes a list of base stations assigned to the mobile's active set. The handoff direction message may also include auxiliary information, such as handoff thresholds (e.g., add threshold and drop threshold) which is useful to the mobile station after performing the handoff. As described in the above referenced applications and in the IS-95 standard, the active set contains pilots from base stations with which an interface to the mobile has been established. The candidate set contains pilot channels that have recently been detected with a sufficient strength by the mobile, and the candidate set contains pilot channels from base stations known to be in the same geographic region.

Knowing which pilot channels will likely have a reasonable strength (i.e., by knowing which base stations are assigned to the mobile's neighbor and candidate set), the processing required at the mobile is reduced in that the mobile may search more frequently for the pilot channels corresponding to the base stations in the mobile's neighbor and candidate sets, as well as in the active set.

Figure 2:
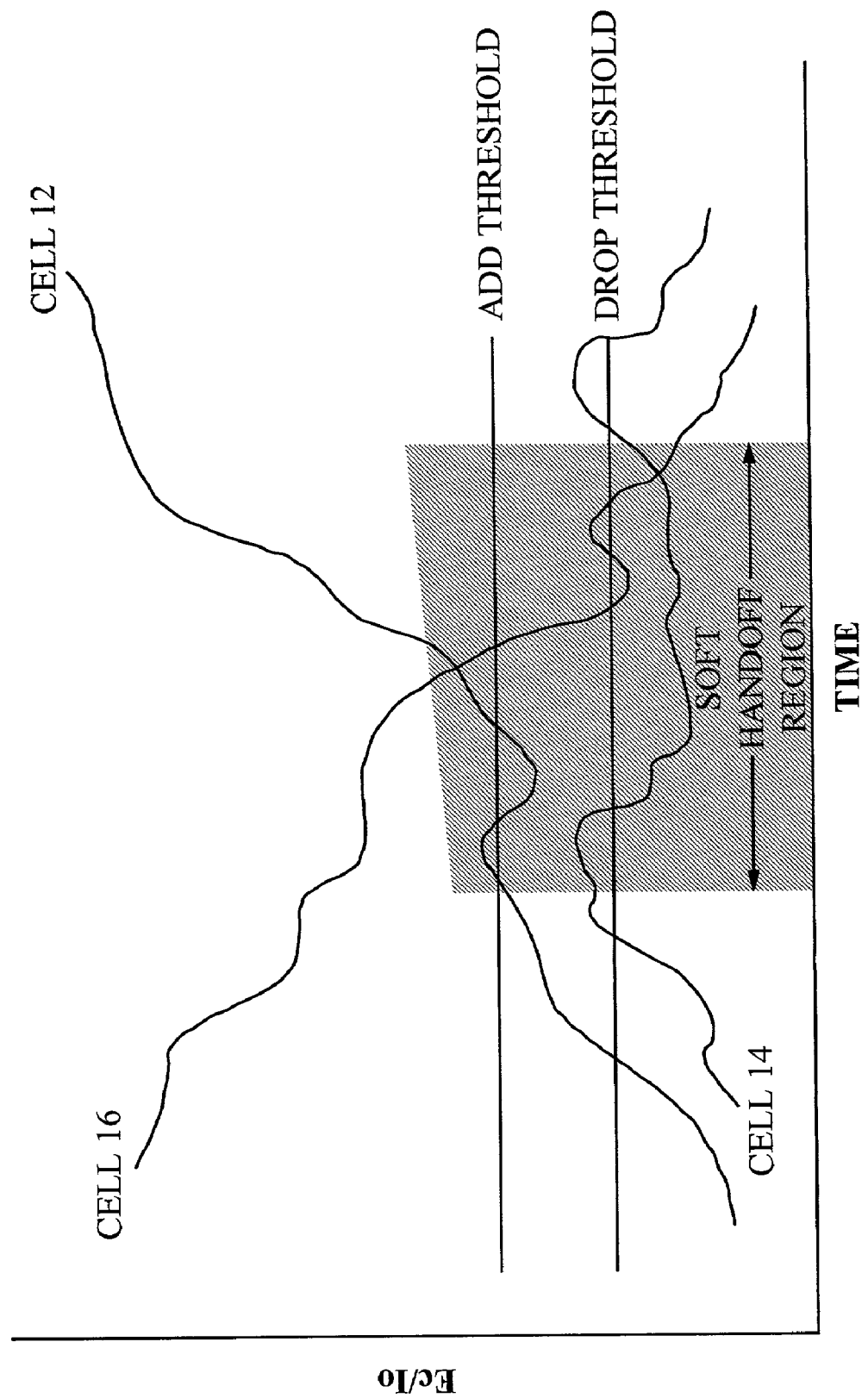
FIG. 2 is a graph of pilot channel quality versus time and a soft handoff region displayed on the graph.

FIG. 2 is a graph showing relative pilot channel quality that may be observed by the mobile 18 from cells 12, 14 and 16, as shown in FIG. 1. The graph in FIG. 2 plots energy per PN chip ($E_c$) per total received power ($I_o$) at the mobile 18 vs. time for three exemplary pilot channels from base stations 12, 14, and 16. As shown in FIG. 2, the pilot from base station 16 degrades in signal quality with increasing time, indicating the mobile 18 is moving away from base station 16. Conversely, the pilot from base station 12 improves in signal quality with time, implying that the mobile 18 is moving toward base station 12. The pilot from base station 14 remains relatively constant in signal quality, indicating the mobile 18 is moving along a coverage perimeter of base station 14.

The area of interest in FIG. 2 is the soft handoff region. In the soft handoff region, the mobile 18 and the system controller 10 communicate with one another to determine which base stations should be within the mobile's active set based on the relative pilot channel qualities of the cells 12, 14 and 16. In the illustrative example, the pilot channel from base station 16 is originally in the mobile's active set because base station 16's pilot channel level is above the add threshold level. However, at the end of the soft handoff region, the pilot from base station 16 drops below the drop threshold level for some period of time.

In response, base station 16 is caused by the system controller 10 to be dropped from the active set by the mobile communicating to the system controller 10, via a pilot strength measurement message. Because the pilot from base station 14 never surpasses the add threshold level, base station 14 is not added to the active set. In contrast, base station 12 surpasses the add threshold level for the necessary period of time, and thus is added to the active set as determined by the system controller 10 in response to a pilot strength measurement message generated by the mobile 18. Toward the end of the soft handoff region, only base station 12's signal remains within the mobile 18's active set.

Often, the poorly received pilot channel is detected above the drop threshold with sufficient frequency to keep the corresponding base station in the active set, even though the corresponding traffic channel contributes little to the reception quality at the mobile. This is particularly true in a slow fading environment. In the case of a slow fading environment, the received signal levels from the base station slowly change relative to each other. Typically one base station is stronger than another for a while and vice-versa. The fading rate is not sufficiently fast enough to obtain the short-term benefit of diversity. Thus, it would be preferable to transmit from the stronger base station and not from the weaker base station.

The present invention seeks to reduce the transmission time of the code channels from some base stations in a fading environment to decrease the total transmit energy generated for the associated communication. Reducing the total transmit energy of a particular communication improves overall system capacity. It should be noted that one could use handoff procedures which would remove the base stations from the active set, thus reducing the transmit power. However, this approach requires considerable signaling in the infrastructure and is thus relatively slow. This makes it difficult to quickly switch to transmitting from another base station when its signal becomes the stronger signal.

Another case in which this invention provides benefit is when one base station is received at the mobile station at a lower signal level than the other base station, but is still above the drop threshold. In an environment with little fading, it is preferable to transmit only from the base station whose signal is being received more strongly at the mobile station. However, removing the base station from the active set and then using the handoff procedures to restore it to the active set adds considerable delay in the case that this pilot becomes stronger. This delay reduces the quality of the link and can result in dropped calls.

Figure 3:
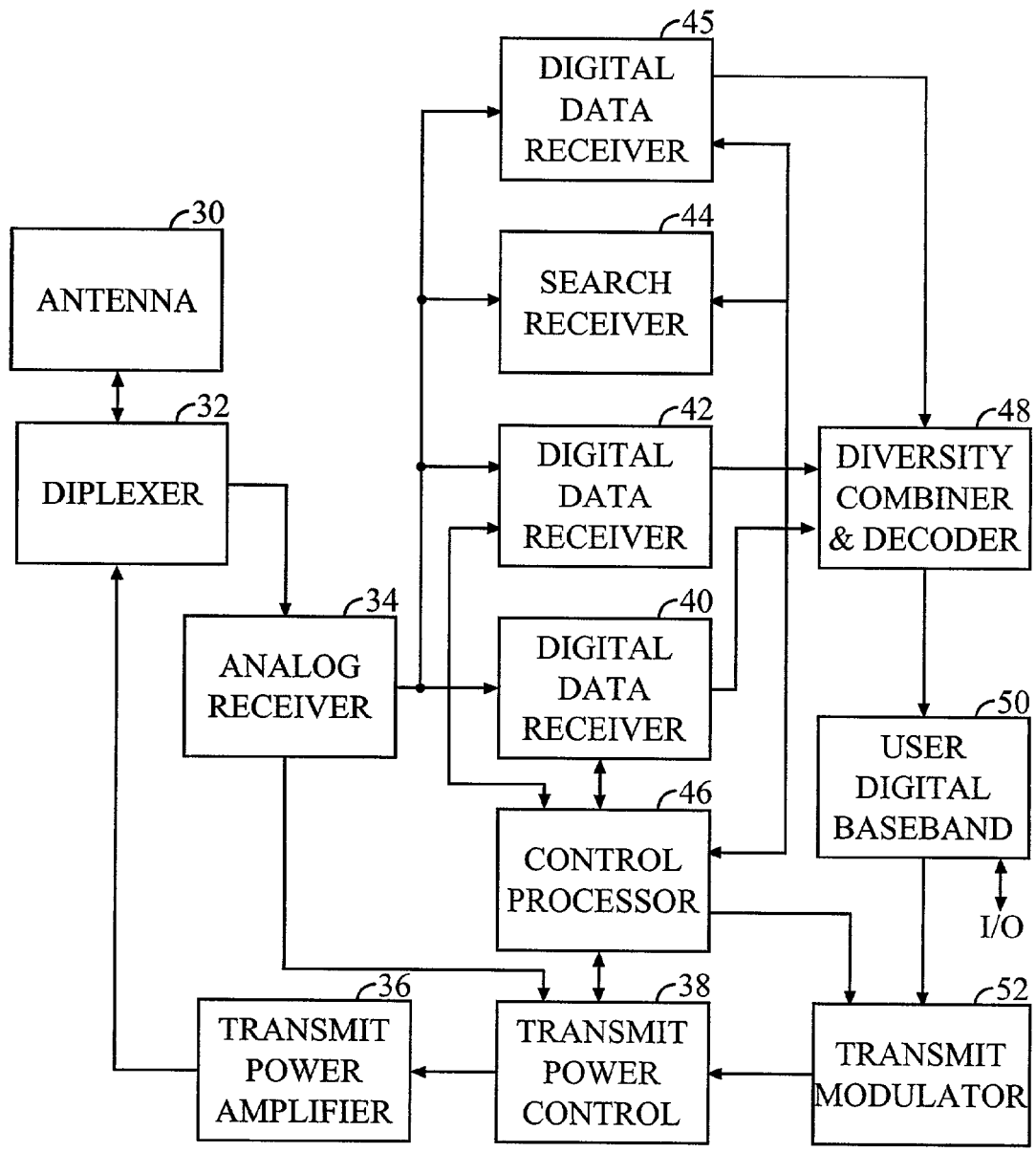
FIG. 3 is a block diagram of a mobile.

FIG. 3 is a block diagram of the mobile 18. An antenna 30 is coupled through a diplexer 32 to an analog receiver 34 and transmit power amplifier 36. The diplexer 32 cooperates with the antenna 30 such that simultaneous transmission and reception is achieved through the antenna 30. While receiving RF energy from the respective base stations 12, 14, and 16 (FIG. 1), antenna 30 receives transmitted pilot and code channel signals routed through diplexer 32 to the analog receiver 34. The analog receiver 34 receives the RF energy from diplexer 32 and implements an open loop power control function for adjusting the transmit power of the mobile station for transmissions on a reverse link (i.e., mobile to base station). More particularly, the receiver 34 generates an analog power control signal that is provided to a transmit power control circuit 38, as is discussed in U.S. Pat. No. 5,056,109, entitled "Method and Apparatus for Controlling Transmission Power in a CDMA Cellular Mobile Telephone System", assigned to the assignee of the present invention, and incorporated herein by reference. A closed loop power control adjustment is developed by control processor 46 using a reverse link power control bit stream which was transmitted on the forward link and demodulated by digital data receivers 40, 42, and 45. The analog receiver 34 converts the received RF energy into a baseband signal and digitizes the baseband signal.

The digitized output from the analog receiver 34 is provided to a search receiver 44 and digital data receivers 40, 42, and 45, which operate under the control of control processor 46, receive code channels from respective base stations, and provide respective outputs to a diversity combiner/decoder 48. The diversity combiner/decoder 48 combines the respective output signals from the receivers 40, 42 and 45 based on a selected combining scheme, discussed later in more in more detail.

While three digital data receivers 40, 42 and 45 are shown in FIG. 3, the diversity combiner/decoder 48 is typically equipped to interface with a number of additional digital data receivers. Preferably, the number of digital data receivers included in mobile 18 is equivalent to the maximum number of code channels (accounting for separate direct and multipath signals produced from each code channel) that the mobile will employ in its combining scheme. As will be discussed, additional diversity gain is possible with the inclusion of additional data receivers, and the present invention is applicable to any number of digital data receivers (or signal multichannel digital data receiver).

The digital data receivers 40, 42 and 45 cooperate with the diversity combiner/decoder 48 to form a "rake" receiver structure. The diversity combiner/decoder 48 cooperates with each of the respective receivers 40, 42 and 45 serve as three "fingers" in a rake. More particularly, the receivers 40, 42 and 45 may be set by the control processor 46 to receive code channels from different base stations, or an multipath signal from a common base station. Thus, all three receivers 40, 42, and 45 may be used to receive code channels from three different base stations, or a signal code channel from a base station which arrives via three different signal paths (i.e., three multi-path signals). It should be clear that the receivers 40, 42, and 45 may be used to receive any combination of multipaths and code channels from different base stations. The rake receiver structure may also be implemented in numerous other configurations based on, for example, several single channel receivers, multichannel receivers (i.e., having at least one channel) and diversity combiner combinations. Furthermore, the diversity combiner function could be incorporated into control processor 46, or one of the receivers 40, 42, 44, and 45.

In the preferred embodiment, the output of the diversity combiner/decoder circuit 48 is passed to a deinterleaver and a decoder. The output of the decoder is typically passed through a control unit which splits apart the received data stream into end user data and control data. The end user data is supplied to a data device, such as a speech coder.

The data output of a data device, such as a speech codec is to be transmitted on the reverse link to the base stations in the mobile station's active set. The output of the user digital baseband circuit 50 is a baseband signal which is formatted, encoded, interleaved, and is passed to a transmit modulator 52 where it is modulated. An output of the transmit modulator 52 is passed through a transmit power control device 38 under control of the control processor 46. The transmit power control circuit 38 adjusts the output power of the mobile 18 (FIG. 1), based on the power level signal provided by analog receiver 34 and closed loop power control bits, and an output RF signal is passed to a transmit power amplifier 36 which amplifies the output signal and passes the amplified output signal through a diplexer 32 and transmitted through antenna 30.

The digitized IF signal from the analog receiver 34 contains the code channel signals and pilots transmitted by the base stations in the pilot's active set along with other CDMA signals which act as interference to the mobile 18. The function of the receivers 40, 42 and 45 is to correlate IF samples with the proper PN sequence. This correlation process provides the "processing gain" which enhances the signal-to-interference ratio of the signal intended for the mobile by matching the PN sequence used in the respective code channels to encode the message being sent to the mobile. Unintended signals that have not been encoded with the matching PN sequence are "spread" by the correlation process, thereby decreasing the signal-to-interference ratio for the unintended signals. The correlation output is coherently detected using the pilot carrier as a carrier phase reference. The result of this detection process is a sequence of encoded data symbols.

Search receiver 44, under control of the control processor 46, scans for received pilot channels and multi-path pilot channels from the base station via direct paths and reflected paths (e.g., multipaths). The search receiver 44 uses a ratio of the received pilot energy per chip (Ec) to total received spectral density, noise and signals, denoted as $E_c/I_o$, as a measure of the quality of the received pilot. Receiver 44 provides a signal strength measurement signal to the control processor 46 indicative of the respective pilot channels and their strengths.

The diversity combiner/decoder circuit 48 adjusts the timing of the inputted received signals into alignment and adds them together. This addition process may be preceded by multiplying the respective inputted signals by a weighting factor corresponding to the relative signal strengths of the pilot channels corresponding to the respective inputs. The weighting factor is based on the pilot strength because it is presumed the respective signal quality of each pilot corresponds with the signal quality of the signals transmitted on the respective base stations' code channel. When using the weighting factor, the combiner implements a maximal ratio diversity combining scheme. The resulting combined signal stream is then decoded using a forward stream error detection decoder that is also contained within diversity combiner/decoder circuit 48. The pilot based weighting method works well when the base stations in the active set transmit the code channel signals to the mobile station in equal proportion to the pilot signal. That is, the ratio of code channel power to pilot power is the same in all members of the active set. If the ratio is not the same, then other weighting methods may be preferable. For example, the base station may send to the mobile station, in a signaling message or by some other means, the ratio of traffic channel to pilot channel power being used by all base stations in the active set. Then if the relative fraction for base station j is $\alpha_j$, mobile station can combine code channels using weights $\sqrt{\alpha_j \gamma_j}$ where $\gamma_j$ is the relative received power of the pilot for base station j at the mobile station. Alternatively, the mobile station may estimate $\alpha_j$ or $\alpha_j \gamma_j$ from the received signal from base station j.

Baseband circuitry 50 includes voice coder (vocoder) data interfaces and other baseband processing features. In addition, user digital baseband circuit 50 interfaces to I/O circuits such as a handset which inputs a voice signal to a digitizer and vocoder (voice coder) contained therein. The output of the user digital base band circuit 50 is provided to a transmit modulator 52 which modulates an encoded signal on a PN carrier signal whose PN sequence corresponds to an assigned address function for the outgoing call. This PN sequence is determined by the control processor 46 from call setup information that is transmitted by the base station (12, 14 or 16) and decoded by the receivers (40, 42 or 45).

The output of the transmit modulator 52 is provided to the transmit power control circuit 38 where the signal transmission power is controlled by the analog power control signal provided from the receiver 34. Furthermore, control bits are transmitted by the base stations in the form of power adjustment commands, to which the transmit power control circuit 38 is responsive. Transmit power control circuit 38 outputs the power control modulated signal to transmit power amplifier circuit 36, which amplifies and converts the modulated signal to an RF frequency. Transmit power amplifier 36 includes an amplifier which amplifies the power of the modulated signal to a final output level. The amplified output signal is then passed to the diplexer 34 which couples the signal to the antenna 30 for transmission to the base stations 12, 14 and 16. Signals intended for the system controller are received by the base stations 12, 14, and 16 and respectively passed to the system controller 10 where they are combined.

Figure 4:
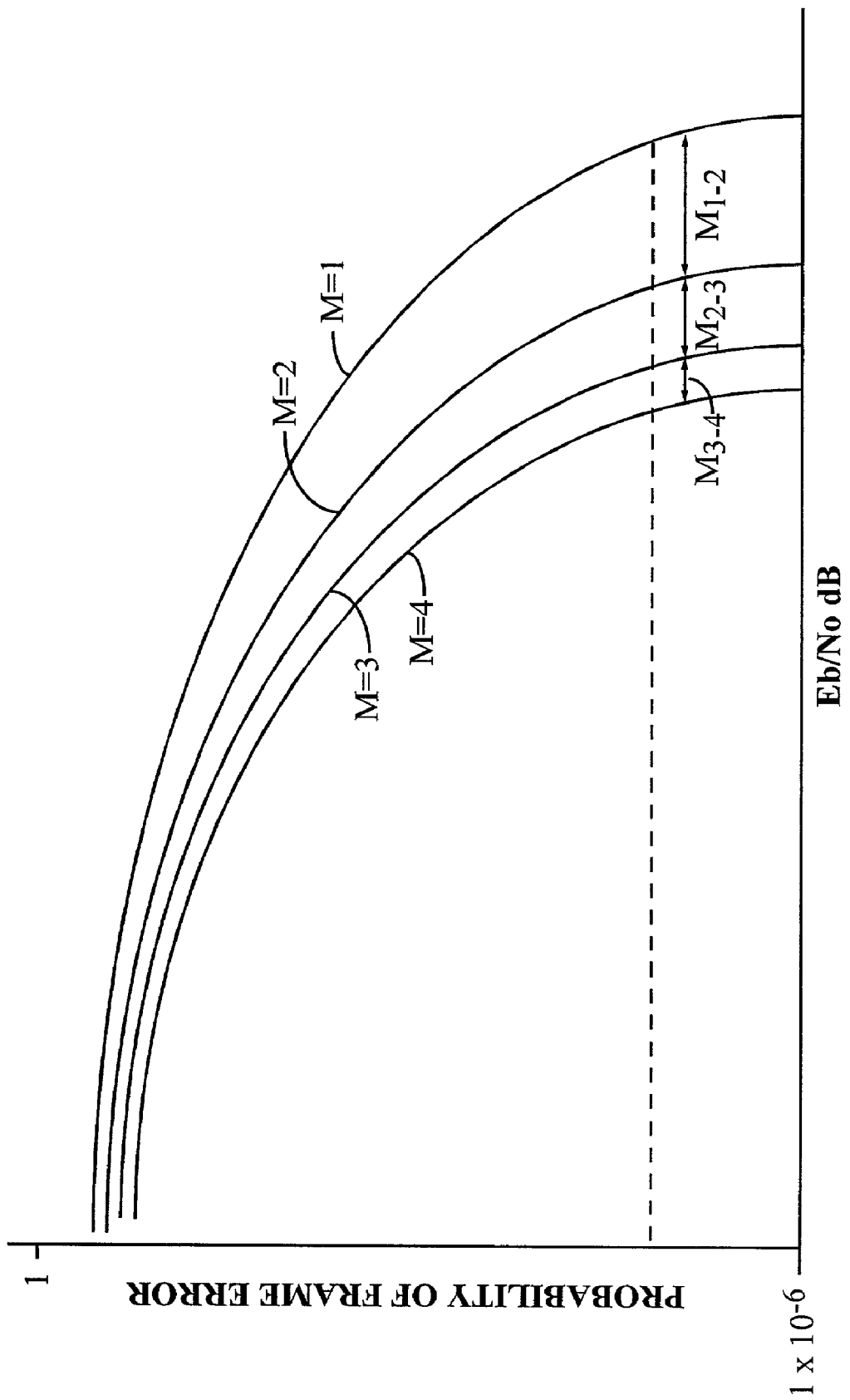
FIG. 4 is a graph showing exemplary probability of frame error rate vs. Eb/No for various numbers of transmitting base stations as received by an N-finger diversity receiver.

FIG. 4 is a graph of a diversity receiver performance, measured in probability of frame error rate, versus Eb/No where the diversity receiver implements maximal ratio combining. Four exemplary curves representative of probability of frame error rate are shown respectively representing a mobile receiver having one finger (M=1), two fingers (M=2), three fingers (M=3), or four fingers (M=4) configured to receive signals from a corresponding number of a base stations. Comparing the curves for M=1 and M=2, the performance of a receiver having two fingers and processing two paths is better than that for receiver processing one path. This comparison is made by observing, for a given frame error rate (i.e., the dashed line), a distance between the respective probability of frame error curves. In the exemplary graph, a performance improvement is shown by the distance $M_{1-2}$. Similarly, if a diversity receiver having three fingers is used by the mobile, a performance improvement of $M_{2-3}$ is achieved where, generally, $M_{2-3}$ is less than the performance improvement of $M_{1-2}$. Similarly, adding a fourth finger to a diversity receiver, provides a performance improvement as shown by $M_{3-4}$. It should be noted that $M_{3-4}$ is less than $M_{2-3}$ and $M_{1-2}$. Thus, if the mobile were the only mobile in the CDMA system, diversity receivers having an increasingly large number of fingers receiving a corresponding number of transmissions from base stations, would provide continuing improved performance, albeit, the improvement reaching de minimis returns for M being a large number. Furthermore, the aforementioned performance relationship presumes none of the fingers contribute only noise (or practically only noise) to the combining process. Absolute amounts of improvement depend on the communications conditions (e.g., amount of fading, type of fading, impulsivity of noise, proximity to base station, etc.).

During soft handoff, system capacity is affected differently by exploiting diversity combining processes on the forward link and on the reverse link. For example, on the reverse link, the mobile transmits to the base stations 12, 14, and 16 through paths 20a, 22a, and 24a (FIG. 1) respectively. Each of the base stations receive the transmission from the mobile 18, and forward the same to the system controller (selector) 10, which combines the respective signals provided by the base stations 12, 14, and 16 using a diversity combining process. Because only one mobile 18 is transmitting, the system capacity is not adversely affected by the use of diversity combining.

On the forward link, however, the mobile 18 combines different signals (all having the same encoded information) transmitted from base stations 12, 14, and 16. Various methods for combining are known in the art including maximal ratio combining, equal gain combining, and simple selection whereby one signal is selected for processing and the other signals are discarded. Providing an additional, and perhaps excessive, number of base stations to the mobile's active set will certainly improve the performance observed at that mobile, but may actually degrade an overall system capacity of the CDMA system, since additional transmissions from the base stations communicating to the first mobile will appear as background interference to a second mobile. The usefulness of a particular code channel depends on a variety of factors, including its strength relative to the code channels from other base stations.

The total power radiated in the CDMA communications system is typically smaller if there is a sufficient gain in diversity. However, as recognized according to the present invention, the total power which is radiated is typically larger than what is required for adequate performance even if the additional diversity is not needed. Whether an increase or decrease in an amount of radiated power from each of the base stations is affected, depends on characteristics of the transmission paths between the base stations and the mobile station. In accordance with one embodiment of the invention, the total transmit power from the CDMA system is set to a more optimum operating point by increasing the coordination between the mobile 18 and system controller (selector) 10. A description follows on how to collect at the mobile the information needed so the system can operate at a higher capacity.

Figure 5A:
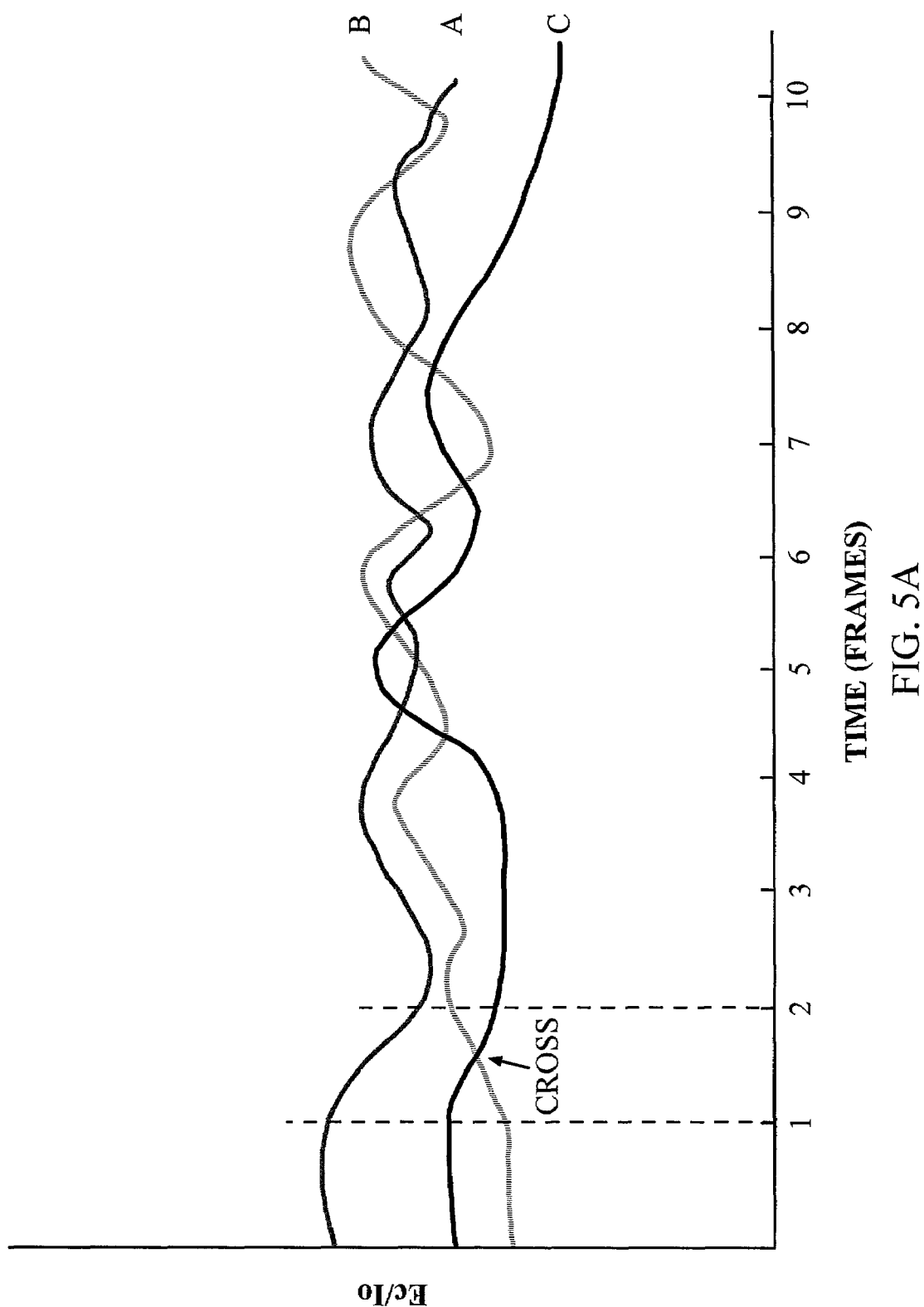
FIG. 5A is a graph showing Ec/Io vs. time within a soft-handoff region for three exemplary pilots.

FIG. 5A is a graph of Ec/Io vs. time for a soft handoff region in which three pilots A, B, and C from respective base stations are included in the mobile's active set. During the soft handoff region, as seen from FIG. 5A, changes in the respective communication channels for pilots A (shown by a dotted line), B (shown by a dashed line), and C (shown by a solid line) cause variations in signal strength and thus signal-to-noise ratios which cause respective pilots A, B, and C to fluctuate. It is these fluctuations that offer significant potential for improving diversity gain, and the present invention teaches how to exploit the diversity gain so to maximize system capacity by changing forward traffic channel power allocation in rapid fashion.

The relative pilot quality strengths (pilot quality) of the pilots A, B, and C fluctuate from frame to frame, and as seen from FIG. 5A, any one of the signals A, B, and C varies in SNR relative to the other signals. For example, in the first frame, pilot A provides the greatest SNR while pilot B provides the least SNR. However, in frame 2, the relative signal-to-noise ratios of pilots B and C cross (as shown in FIG. 5A) and at the end of frame 2 the SNR of pilot B is greater than that of pilot C.

Figure 5B:
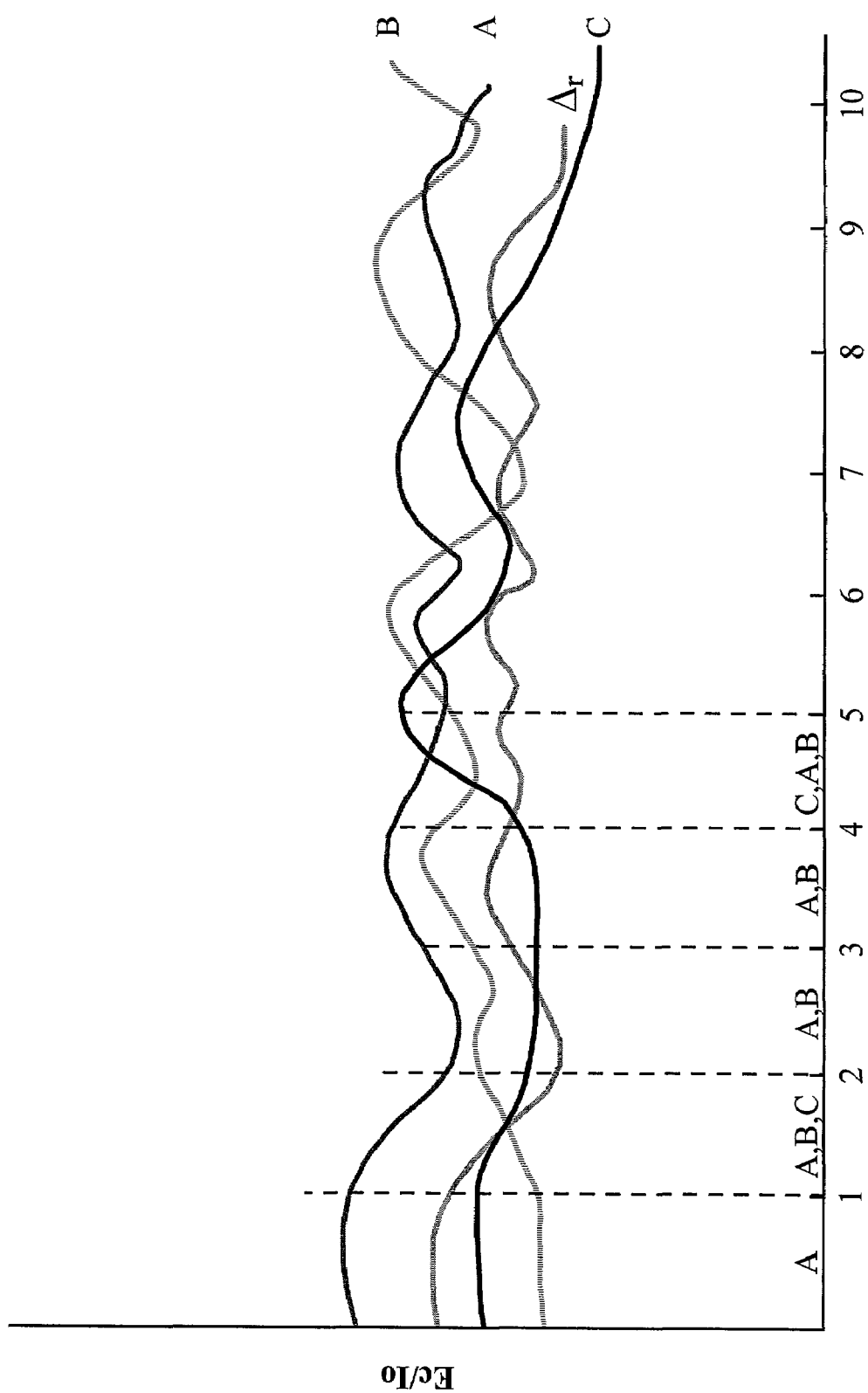
FIG. 5B is a graph similar to that shown in FIG. 5a with the addition of a threshold signal $\Delta r$ which is formed below a highest pilot level.

FIG. 5B is identical to FIG. 5A, but includes a level $\Delta_r$ (shown as a crossed "x" line), calculated by control processor 46 (FIG. 3) of mobile 18, where $\Delta_r$ is representative of a fixed level $\Delta$ beneath the strongest signal-to-noise ratio of the pilots A, B, and C in the mobile's active set. Preferably, $\Delta_r$ is a single number generated by the control processor 46, although variations of $\Delta_r$ (i.e., a plurality of $\Delta$'s) may alternatively be employed, such that gradations of $\Delta$ are used to resolve more finely the relative signal qualities of the pilots. Control processor 46 calculates a threshold signal $\Delta_r$ preferably continually, although an alternative piecewise or discrete implementation $\Delta_r$ may be produced.

As shown in FIG. 5B during the first frame, only the pilot $\Delta A$ at or above the threshold signal $\Theta_r$, which, in this example, is set by the pilot A itself (i.e., pilot A has the strongest SNR and thus $\Delta_r$ is based on a level $\Delta$dB beneath the SNR set by pilot A). It is also noted that signals B and C are not at or above signal level $\Delta_r$. Accordingly, FIG. 5B indicates in frame 1 that pilot A (as denoted by the character "A" written over top of the "TIME" axis in the first frame) is at or above the signal $\Delta_r$ and has the greatest average SNR over that past frame interval. In frame 2, the strongest SNR is that of signal A, followed by pilot B, and the lowest pilot is C, all of which are above $\Delta_r$ at the end of the frame. In frames 3 and 4, only pilots A and B are above $\Delta_r$. In frame 5, pilot C has the strongest SNR (and thus $\Delta_r$ is calculated based on pilot C). Pilot A is then the next strongest signal and is greater than the SNR of pilot B, all of which are above $\Delta_r$.

By calculating $\Delta_r$ and comparing $\Delta_r$ to each of the respective signals from the base stations in the active set, the mobile has effectively gathered a significant amount of information regarding particular communications channels within a given frame. This characterization of the communications channels may be exploited by the mobile by configuring the mobile's diversity receiver and combiner in order to detect optimally the signals transmitted from the respective base stations. Additionally, in accordance with one embodiment of the invention, the CDMA communication system performance is also optimized by communicating the best signal qualities of the pilots within the active set to the system controller on a frequent basis so the system controller can make commensurate adjustments on the forward traffic channel power allocation between the base stations in the active set. The information is rapidly communicated to the system controller 10 (FIG. 1) because the optimum number and selection of transmitting base stations does not remain constant as the relative SNR's of the signals from each base station change rapidly from frame to frame as illustrated in FIG. 5.

It should also be noted that the a value which is used to compute $\Delta_r$ could be pre-stored in the mobile station or it could be sent to the mobile station via a signaling message or some other control method. It should also be noted that FIGS. 5A and 5B are described in the context of frames which may correspond to the frames used for data framing, interleaving, and encoding on the traffic channel as described in the IS-95 standard. However, this is not necessary in this invention and the frames shown in FIGS. 5A and 5B may not correspond to any particular processing interval, and may be either shorter or longer than the exemplary value of 20 ms. Additionally, the various transmissions described above are generated by different base stations. However, the invention is also applicable to any element radiating a forward link signal. In particular, the invention applies to different antennas at the same base station radiating the same signal. For example, the signals A, B, and C in FIGS. 5A and 5B can be from different antennas of the same base station, as would be the case where there are three antennas at one base station.

It should also be understood that the set of signals A, B and C shown is FIGS. 5A and 5B can be from any combination of base stations or antennas at a base station. For example, signals A and B could be from two different transmitting antennas at base station 17 and signal C could be transmitted from base station 19. Signals A, B, and C could be multi-carrier forward links all transmitted from the same base station, or could be the signals from different antennas radiating the multi-carrier forward link. For example, if base station 17 transmitted three carriers from two antennas, then signal A could consist of two carriers and signal B of one carrier. Signal A would be comprised of two different separate carrier signals, however, in this example, both these carriers are radiated from the same antenna and will be received by the mobile station essentially at the same level, provided that they are transmitted at the same level. It should also be clear that in a real system there may be many more than three signals (which are show in FIGS. 5A and 5B) which the mobile station is tracking.

To provide the system controller 10 (FIG. 1) with this information on a rapid basis, the present invention provides a novel communications protocol between a mobile and system controller 10 discussed herein in reference to FIGS. 6A–6C. FIGS. 6A–6C show alternate forms of a signaling or control messaging in the form of a bit vector message reported to the system controller (selector) 10 through the reverse link signal transmitted from the mobile 18 to the selector 10 by way of one or more base stations (12 and 14). The bit vector message is preferably transmitted on a frame-by-frame basis, although more frequent reporting, as well as less frequent reporting, are alternatives.

In one embodiment of the invention, a multichannel reverse link signal is employed, where the reverse link signal is comprised of a set of orthogonal code channels defined by a set of Walsh codes in similar fashion to the forward link. In this multichannel reverse link implementation, the bit vector message is preferably communicated through one of the orthogonal code channels in the reverse link, so to minimize the delay time before the system controller can act on the information contained in the bit-vector message. A system and method for transmitting data using such a reverse link signal is described in issued U.S. Pat. No. 5,930,230 entitled "HIGH DATA RATE CDMA WIRELESS COMMUNICATIONS SYSTEM" issued Jul. 27, 1999, assigned to the assignee of the present invention and incorporated herein by reference.

In an alternative embodiment of the invention, a single code channel reverse link signal is employed, as is used in an IS-95 compliant system. The bit-vector message is preferable transmitted along with the other user data within the single code channel via time multiplexing or bit puncturing the data vector into the reverse link PN code.

FIG. 6A shows a data structure for pilot quality bit-vector message generated by the mobile and transmitted to the system controller 10 via the base stations. In particular, FIG. 6A shows a 10-bit vector message which is short in length, yet capable of reporting to the system controller 10 which of the pilots in the mobile's active set have signal qualities at or above a given standard (e.g., the $\Delta_r$ threshold signal in FIG. 5B). The bit-vector message need not be limited to 10-bits, and can be in other formats other than a bit-vector although it is desirable to have a short message. In order to reduce the number of transmitted bits, the bit-vector message presumes an arrangement of the respective pilot channels based on an initial ordering of the pilots identified to the mobile from the system controller in a handoff direction message.

The CDMA IS-95 standard permits up to six members (pilots) in the active set, all of which can be accommodated in the pilot quality bit-vector message. In FIG. 6A, the pilot having the best (i.e., highest signal to interference ratio) as judged by the process described in reference to FIG. 5B, is identified by a three-bit data field index which uniquely identifies its position as originally reported to the mobile in the handoff direction message. The index is denoted in FIG. 6A by the three-bit data field $I_1$, $I_2$, and $I_3$. Thus, if the pilot channel from the second base station reported to the mobile in the last handoff direction message is received with the greatest SNR, the three bit index is set to two (binary 010), or alternatively 1 if the index runs from 0 to 8.

The bit fields $U^1$, $U^2$, $U^3$, $U^4$, $U^5$, and $U^6$ each refers to respective pilots as originally listed in the handoff direction message, and indicates whether the corresponding pilot channel was received above the $\Delta_r$ threshold signal. For example, the bit in the data fields $U^{1-6}$ is set to 1 (or alternatively 0) indicating to the system controller 10 that the pilot channel corresponding to that bit position is being received equal to or above the $\Delta_r$ threshold signal. In particular, if $U^1$ is set to a 1, the system controller 10 would recognize that the first pilot identified in the last handoff direction message has a signal-to-noise ratio at the mobile as being equal to or above $\Delta_r$, as calculated by control processor 46. $U^{2-6}$ are also set by the processor 46 preferably on a frame-by-frame basis and transmitted to the system controller 10 via the base stations in bit-vector messages.

The last element of the data field, $H'''$, is the sequence number of the handoff direction message. The data field $H'''$ is used to provide the system controller 10 with an identification of the active set to which the mobile is referring. $H'''$ could be several bits in length; alternatively it could be a single bit. For the single bit case, $H'''$ could be the last bit of the sequence number. Thus, if the base station sent handoff direction messages with sequence numbers equal to '100' followed by '101' binary, then the mobile station would return '1' in $H'''$ if it were referring to the handoff direction message with sequence number '101' and would return '0' in $H'''$ if it were referring to the handoff direction message with sequence number '100'. By including the sequence number, the base station can positively determine which pilot the mobile station is referring in the three-bit data field $I_1$, $I_2$, and $I_3$ and in the set $U^1$, $U^2$, $U^3$, $U^4$, $U^5$, and $U^6$.

In an embodiment of this invention which includes a multi-carrier forward link, the bit vector $U^1$, $U^2$, $U^3$, $U^4$, $U^5$, and $U^6$ can be expanded to N×M bits, where there are N possible base stations in the active set and there are M possible antennas at a base station. Alternatively, M can correspond to the number of possible multi-carrier forward links at a base station. In this embodiment, the mobile station reports the strongest of the N×M multi-carrier forward links with the vector $I_1$, $I_2$, and $I_3$ (which may need to be longer to take into account the need to identify the largest of N×M items) and reports which other multi-carrier channels are above $\Delta_r$ using the vector $U^i$. In an alternative embodiment, the mobile station reports the strongest base station, rather than the strongest carrier, using vector $I_i$ and then reports which other multi-carrier channels are above $\Delta_r$ using the vector $U^i$.

It should be noted that $\Delta_r$ can be either with respect to the strongest base station or the strongest carrier over all base stations in the mobile station's active set. It should further be noted that the strongest base station can be determined by summing the pilot $Ec/I_0$'s from all the forward link carriers of a multi-carrier base station as has been done with multipath components from the same carrier as is commonly used in IS-95. Thus, the total strength of a base station is given by summing $Ec/I_0$'s from all the forward link carriers and all multipath components on a particular carrier.

In response to the bit field message, the system controller 10 receives the measured power message and, as will be discussed herein, determines which of the signals in the active set to remove from the forward traffic channels, and which of the base stations to keep transmitting. That is, system controller 10 identifies which base stations are transmitting signals that are being received below the $\Delta_r$ threshold signal using the bit field message. System controller 10 then instructs the identified base stations to stop transmitting the traffic channel directed to the corresponding mobile, which in turn reduces the transmit power of the forward link signal generated by these base stations. In an alternative embodiment, the base station, instead of the system controller, can receive the message and determine whether it is to transmit the forward link. This method lowers delay though it may be less reliable when the mobile station is in soft handoff as all base stations (or the base stations which should be transmitting the forward link) may not receive the reverse link transmission.

The base stations respond by not transmitting the traffic channel during next frame of data directed to the corresponding mobile. Because the signals from the identified base stations are being received by the mobile 18 with a significantly lower SNR than at least one other forward link signal, the increase in the error rate of the mobile will be small relative to the reduction in transmit power for the entire system. While the identified base stations discontinue transmitting the traffic channel, the signal processing resources within those base stations will remain allocated and ready to begin transmitting the traffic channel upon request by system controller 10. Also, these base stations preferably continue to process the reverse link signal transmitted from mobile 18.

As the communication continues, mobile 18 continues to monitor the relative strength of the pilots received from the base stations in the active set. When the status of a pilot changes, for example when a pilot is received above the $\Delta_r$ threshold, mobile 18 generates another bit field message indicating this change in status. Mobile 18 also generates a bit field message when the pilot channel with the best SNR changes. System controller 10 receives the bit field message and instructs any base station in the active set for which the status has changed to either begin transmitting the traffic channel for that mobile, or to discontinue transmission of the traffic channel, as the case may be. Each base station responds by transmitting the next data frame via the traffic channel if the instruction was to begin transmission, or by not transmitting the next data frame if the instruction was to discontinue transmission of the traffic channel.

In alternative embodiments of the invention, mobile 18 generates bit field messages periodically, for example once each frame. By keeping resources allocated within each base station for transmitting the traffic channel, the traffic channel can quickly be activated and deactivated in response to rapidly changing conditions.

In still another embodiment of the invention, the system controller 10 includes a gain adjust field in each data frame sent to a base station. The gain adjust field indicates the transmit power gain at which the frame is to be transmitted from the base station. When system controller 10 receives a vector indicating that the pilot channel from a particular base station is received less than the $\Delta_r$ threshold below the strongest pilot channel, the gain adjust in the next frame directed to that subscriber is reduced. Subsequent frames can be reduced further as more vectors indicate the pilot channel from that base station remains the $\Delta_r$ threshold below the strongest pilot.

Control system 10 may also perform a more advanced analysis of the bit vectors received to better determine the stability of the environment in which the mobile is operating. In particular, control system 10 may monitor the rate at which a particular pilot channel changes from being above and below the $\Delta_r$ threshold. If the rate of change exceeds a predetermined threshold, control system 10 will determine that the mobile is in a fading or otherwise unstable environment, and therefore that the signal from each base station in the soft handoff should be transmitted continuously. When such a determination is made, control system 10 instructs all the active set base stations to continue transmitting the forward link traffic channel, even when some pilot channels are detected the $\Delta_r$ threshold below the best received pilot channel.

FIG. 6B shows an alternative data structure for a pilot quality bit vector message transmitted from the mobile to the system controller 10 via the base station. This alternative embodiment is similar in structure to the data structure defined in FIG. 6A although only including five bits for identifying the six members of the active set. Only five bits are used because the identity of the sixth (i.e., the base station providing the strongest signal-to-noise ratio) is identified by the first three bits of the pilot quality bit vector message (i.e., $I_{1-3}$). By uniquely identifying the strongest signal in the first three bits of the pilot quality bit vector message, each of the other members of the active set is sequentially identified by the subsequent bits in the pilot quality bit vector message, with an implicit understanding that there is no bit identifying the position of the strongest base station.

FIG. 6C shows a further alternative pilot quality bit vector message format where the first three bits $I_{1-3}$ are used to uniquely identify the strongest pilots of the base stations in the active set, the next three bits, $J_{1-3}$, identifying the second strongest, and the third set of three bits, $K_{1-3}$, identifying the third strongest pilot of the members of the active set. Thus, each of the three strongest pilots of the members in the active set are uniquely identified. An extension of this embodiment would be to add an additional three bits for each of the fourth, or fifth, or sixth strongest pilot from the members of the active set thus uniquely identifying them. A further embodiment would be to add an additional bit to the message to indicate the relative strength of the pilots in finer quantization levels, rather than merely above and below the threshold $\Delta_r$. A still further embodiment would be to include all the Ec/Io value for each pilot. Thus, for a system with six possible pilots in the active set, the Ec/Io would be included for each possible pilot in the active set. It should also be clear that sending the Ec/Io of the largest pilot in the active set and then relative Ec/Io values relative to the largest pilot is another possible embodiment. While each of the embodiments in FIG. 6A through FIG. 6C define alternative ways to report the relative measured powers preferably on a frame-to-frame basis, combinations of the alternative methods are possible as well. For example, the first six bits of the measured power message may be used to uniquely identify the first two strongest pilots of the member base stations, while the next three bits are used to identify the relative positions of the next strongest three pilots (i.e., for a set of five members).

A further alternative approach would be to have only a single base station transmit to the mobile station. In this case, only the three bit vector message (i.e., $I_{1-3}$) needs to be sent from the mobile station to the base station. An alternative arrangement is to have the multi-carrier base station transmit through only one antenna at a time. In this case, a single bit is needed to specify which antenna can be used. Clearly, this can be used in combination with the methods described above.

When communicating over known fast or slow fading channels, an alternative embodiment for determining the $\Delta_r$ threshold is employed to more effectively overcome the effects of fading. In contrast to the preferred embodiment where $\Delta_r$ is based on the pilot having the largest average SNR over the frame, in the present embodiment the minimum value of the maximum pilot over the frame is used to determine $\Delta_r$. Thus, if at least the strongest pilots are subject to fading, setting the threshold $\Delta_r$ at the minimum of the strongest pilot over the frame will permit more pilots to be above the $\Delta_r$ threshold. Accordingly, greater amounts of diversity gain can be achieved by combining signals from more base stations thus adding more independent or at least semi-independent paths. More particularly, in a fast fading environment, the above described use of the minimum value for the strongest pilot over the frame is expected to work suitably well for a fast fading scenario where fade durations are expected to be relatively small with respect to a frame's length.

However, for slow fading channels, the performance of the rake receiver and the mobile is not as great as in the case of the fast fading environment, primarily because an interleaver used in the receive process does not provide as much benefit as it ordinarily would when the fades have a duration which is less than the length of the interleave duration. However, in slow fades where the duration of the fade is greater than the interleaver span, a greater Eb/No is required in order to provide acceptable communication quality at the mobile. Furthermore, the duration of one frame for performing an averaging on respective pilot strengths is insufficiently short to determine whether or not respective communication channels are subject to slow fading.

Accordingly, in this alternative embodiment each of the respective base stations implements a filter, which integrates and normalizes each of the $U_k$ bits (FIGS. 6A and 6B) in the bit vector message. If individual ones of the $U_k$ bits toggle, i.e., changes states at least once, then this toggling indicates the channel between the respective base station and the mobile is subject to slow fading. Accordingly, system performance of the CDMA system will be improved if the base station subject to the slow fading continues to transmit on the forward traffic channel. This observed toggling may also be used as an indicator at the system controller to indicate whether the mobile should be placed in a soft handoff region. For example, if the bit field representing the pilot strength for a given base station is nearly always 0, or always 0, then the respective base station should indicate that the pilot is in fact much weaker than the strongest pilot, and the base station producing the weaker pilot should not be included in the active set because it adds practically no beneficial value to the performance of the mobile. It should also be clear that the mobile station can effectively monitor the toggling operation and then transmit the message to the base station only when it wants to change the base stations transmitting to the mobile station.

Another alternative allows the signaling and switching processes to take place more quickly. In this case, the mobile station signals a base station directly during fading when the signal from that base station becomes either stronger or weaker than the signals from one or more other base stations. The base station responds by not transmitting or not transmitting the next frame. In this case, the switching can be quite rapid because the base station can respond more quickly than the base station controller, allowing a first frame to be sent from one base station and the next successive frame to be sent from another base station. This works at relatively medium fading rates. When the signaling and switching is even faster, the switching can occur during a frame. In this case, the base station must receive the data to be transmitted during the frame. In one embodiment, the base stations encode, interleave, and further process the data for transmission. The data output stream is enabled or disabled based upon the feedback from the mobile station.

As an alternative to the threshold method for determining which pilots to identify in the pilot quality bit vector, a second "finger assignment" method is herein described. In the mobile, the mobile station makes estimates of the received pilot Ec/Io from every base station in the active set. If the mobile does not have a finger of its diversity receiver assigned to the base station, the Ec/Io for that pilot is set to 0. If the mobile station has a diversity receiver finger allocated to a given base station, the mobile determines the average Ec/Io over the previous 20 milliseconds (preferably, although, alternatively, longer or shorter averaging times could be used) and reports that value. The 20 ms period corresponds to a CDMA frame length. The mobile station then identifies the largest pilot having the largest Ec/Io value and assigned an index $A^m$. For all other pilots in the active set, the mobile station sets respective bit values in the bit-vector message to 1 if the Ec/Io value for that pilot is within $\Delta_r$ of the Ec/Io value for the maximum pilot. If the receiver has only N fingers, where N is less than 6, then no more than N pilots are reported in the bit-vector message.

Because fingers may be assigned to both a direct signal path and an image path (i.e., a multipath image), the finger assignment method prevents "too many" base stations from being reported as having signals that are usable by the mobile. For example, if a diversity receiver has three fingers, and only two base stations produce the three highest quality signals (i.e., the direct paths from each base station and an image signal), then there is no need for a third base station to transmit to the mobile, because the receiver does not have enough fingers to receive it. On the other hand, if the pilot from the third base station periodically surpasses one of the other three signals, the mobile may nonetheless report all three stations as being above the desired threshold, because there are a number of instances where the diversity receiver would combine the signal from the third base station. Thus, in one embodiment of the invention, the pilot SNR for a base station is reported based on the finger with the highest SNR received from that base station.

Figure 7:
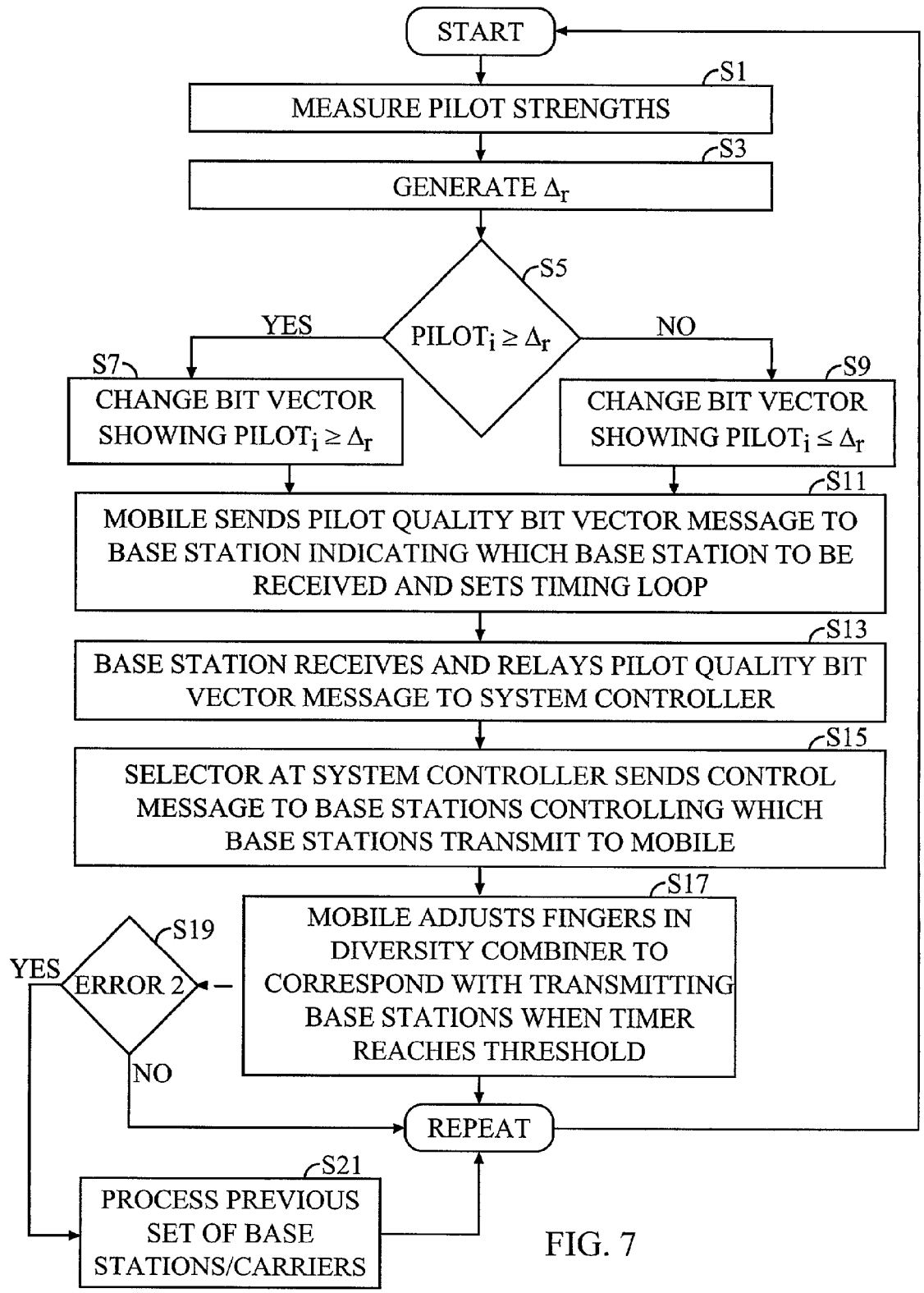
FIG. 7 is a flow diagram of a message sequence for reducing a total amount of forward traffic channel power transmitted from base stations in an active set when excess power is being transmitted.

FIG. 7 is a flowchart showing a preferred method for adjusting forward channel power allocations. The process begins in step S1 where a mobile measures the pilot strengths (signal qualities) of all pilots within the mobile's active set. The process then proceeds to step S3 where the mobile, based on the measured pilot strengths, measured in step S1, generates a threshold signal $\Delta_r$. The signal $\Delta_r$ is generated based on the pilot having the greatest SNR as measured in step S1. The process then proceeds to step S5 where each of the respective pilots, pilots, are compared with signal $\Delta_r$ to determine whether the respective pilot$_i$ is greater than or equal to $\Delta_r$. This comparison step is performed, preferably, over the duration of a 20 millisecond frame period, and terminating at the end of a frame period, although other sampling intervals taken at other points within a frame or in multiple frames is consistent with this embodiment. If the respective pilot$_i$ is greater than or equal to $\Delta_r$, a bit in the bit-vector message (see e.g., FIGS. 6a–6c) indicating that the respective pilot$_i$ is greater than the threshold $\Delta_r$. If however in step S5 it is determined that pilot$_i$ is not greater than or equal $\Delta_r$, a bit in the bit-vector message is set to indicate that the respective pilot$_i$ is less than or equal to $\Delta_r$ (preferably setting the bit to "0").

After the pilot quality bit vector is formed in step S7 or in step S9, the process proceeds to step S11 where the mobile sends the bit-vector message to the base stations in the mobile's active set. At this time, the mobile sets a timing loop, which is used at the mobile as an indicator for the mobile to determine when the mobile should adjust its fingers based on the mobile's anticipation of the system controller 10 adjusting the power in the forward traffic channel in response to the mobile's earlier bit-vector message. By setting the timing loop (which is easily accomplished by the mobile counting consecutive 20 ms frames), the mobile knows when the change in the forward traffic channel transmissions will occur. After step S11, the process then proceeds to step S13 where the base stations receive and relay the pilot quality bit vector to the system controller. After step S13, the process proceeds to step S15 where a selector at the system controller processes the bit-vector message and produces a control message sent to each of the respective base stations in the mobile's active set controlling which of the base stations in the mobile's active set should transmit a respective code channel to the mobile. By controlling transmissions from each of the base stations in the mobile's active set, the total power radiated from the base stations in the mobile's active set is reduced.

The process then proceeds to step S17 where after the timer reaches a time threshold, the mobile adjusts the fingers in its diversity receiver corresponding with the base stations identified as being equal to or greater than the signal $\Delta_r$ as determined in steps S7 and S9. By adjusting the fingers, the mobile combines received energy only from those base stations in the mobile's active set which in fact are transmitting on their respective code channels. After step S17, the process repeats, where the mobile continues to monitor the respective pilot strengths for each of the base stations in the mobile's active set.

Because the mobile station generated the particular bit-vector message and the response of each base station to the bit-vector message is based on a predetermined algorithm, the time at which each base station changes the forward link allocation is known by the mobile station. Thus, the mobile station can properly combine the signals from only those base stations which are transmitting at the time. This is advantageous because combining the signals from base stations that are not transmitting to the particular mobile station would cause unnecessary noise to be introduced into the receive processing negatively impacting the result. This would result in a performance loss, a higher required Eb/No and a loss in capacity. Similarly, if the mobile station did not combine signals which were being transmitted to the mobile station, and which were received with sufficient strength, there would be a loss in capacity.

In one embodiment of the invention, the mobile station compensates for transmission errors in receipt of the bit-vector received by each base station by first attempting to demodulate the received forward frame assuming that the message was correctly received and processed by the base station. In most cases the mobile station will correctly demodulate the frame. However, if the frame is in error, then the mobile station can attempt to use the set of base stations that were transmitting to the mobile station before it sent the most recent bit-vector message. Thus, if the base station did not receive the most recent bit-vector message, then the mobile station would attempt to demodulate the frame again using the set of base stations which was previously used. This requires that the mobile station maintain the received signal from the different set of base stations in a buffer. Then the mobile station would use the data in this buffer when there was an error. This error correction processing is illustrated by optional steps S19 and S21 of FIG. 7, as indicated by the dashed line to step S19.

Figure 8:
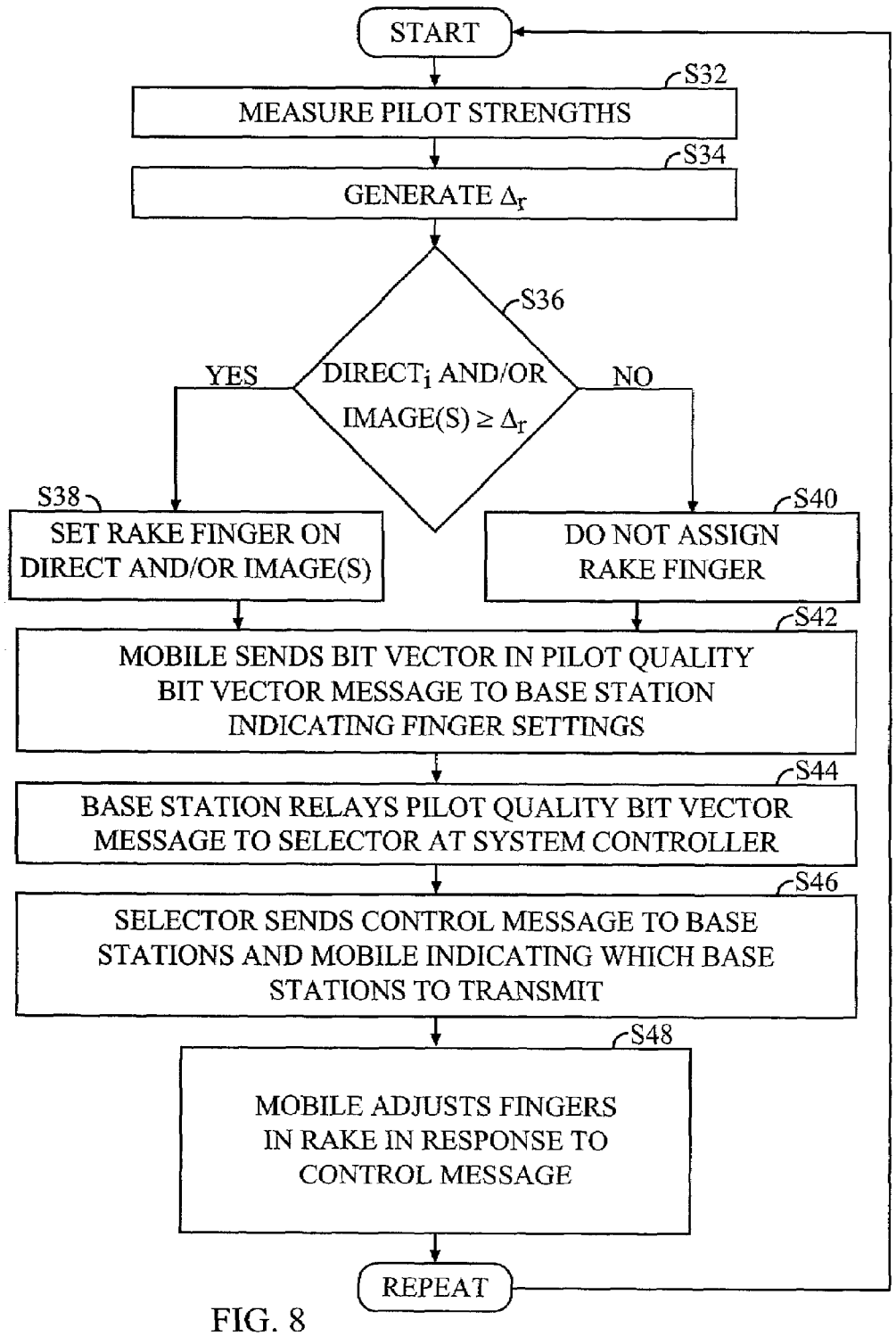
FIG. 8 is a flow diagram of an alternative message sequence for reducing the total power amount of forward traffic channel transmitted from base stations in an active set when excess power is being transmitted.

FIG. 8 is a flowchart of an alternative method for changing forward traffic channel power allocation for the base stations in the mobile's active set. The process begins in step S32 where the mobile measures the respective pilot strengths of each of the base stations in the mobile's active set. Next, in step S34 the mobile generates the threshold signal $\Delta_r$ based on the measured pilot strengths. Then in step S36, the mobile compares both the direct (direct$_i$) and multipath signals, for each of the respective base stations and compares the direct and/or multipath signals to determine whether either the direct or multipath signals are greater than or equal to $\Delta_r$. If a direct or multipath image is greater than or equal to $\Delta_r$, the process proceeds to step S38 where the diversity receiver assigns a finger or fingers to the direct and/or multipath signals that are greater than $\Delta_r$, as determined in step S36. Subsequently, the process then proceeds to step S42. However, if in step S36 it is determined that neither the direct nor multipath signals of a respective base station is greater than or equal to $\Delta_r$, the process proceeds to step S40 where none of the fingers of the rake receiver and combiner circuitry are assigned to that particular base station. The process then proceeds to step S42. It should be noted that the $\Delta_r$ in FIG. 8 is different from that in FIG. 7. In FIG. 7, $\Delta_r$ was used to determine whether to report a pilot; in FIG. 8 it is used to determine whether to assign a finger of the rake demodulator. As such, the $\Delta_r$ in FIG. 8 will typically be smaller than that of FIG. 7.

In step S42, the mobile sends a bit-vector message to the base station and the active set, indicating the finger assignment made at the mobile on the direct and the multipath signals. If either the direct or the multipath signals are greater than $\Delta_r$, the mobile formats the bit-vector message indicating that at least the direct or the multipath image is greater than or equal to $\Delta_r$. The process then proceeds to step S44 where the base station relays the bit-vector message to the selector at the system controller such that the system controller is informed of the finger assignment used at the mobile, and thus, can adjust the forward traffic channel power allocation of which base stations are transmitting to the mobile station for each of the base stations in the mobile's active set. The process then proceeds to step S46 where the selector sends a control message to the base stations in the mobile's active set indicating which of the base stations are to transmit on their respective code channels corresponding to the finger assignment set by the mobile. The base stations relay the control message to the mobile such that the mobile is notified that the base stations having been informed of the system controller's allocation of the forward traffic channel power. The process then proceeds to step S48 where the mobile adjusts the fingers in the diversity receiver in response to the control message generated by the system controller.

It should be noted that either the control message sent from the mobile station to the base station or from the base station to the mobile station may be in error. A technique similar to that was described in conjunction with FIG. 7 can be used. In this case, if the mobile station does not receive the control message from the base station or if it receives a frame in error, it can demodulate previous set of base stations which were transmitting to the mobile station.

In an alternative method for changing forward traffic channel power allocation, steps S1 through S15 are the same as that shown in the preferred method of FIG. 7, although the base station also transmits to the mobile an indication of which of the base stations are in fact transmitting on their respective forward traffic channels. Thus, in this alternative embodiment, the system controller, not the mobile, controls which of the base stations transmits to the mobile.

This invention has been described in terms of setting a threshold $\Delta_r$ relative to the strongest pilot as has been described in the text and FIGS. 5A and 5B. Many alternative metrics can be used. In particular one which sets the bit $U^i$ to '1' only when the pilot sufficiently increases the total Ec/I$_o$ can also be used. This technique is described in U.S. Pat. No. 6,151,502 entitled "Method And Apparatus For Performing Soft Hand-off In A Wireless Communication System" issued Nov. 21, 2000, assigned to the assignee of the present invention and incorporated herein by reference.

The invention has been described in terms of transmitting the entire forward link from a set of base stations mobile station. A system and method for conducting a high speed data link using a fundamental and supplemental channel is described in co-pending issued U.S. Pat. No. 5,987,326 "entitled Transmit Power Reduction For A High Speed CDMA Link In Soft Hand-off", and in U.S. Pat. No. 6,173,007 entitled "High Data Rate Supplemental Channel For CDMA Telecommunications System" both assigned to the assignee of the present invention and incorporated herein by reference. In this high speed data link system, the forward link is split into a fundamental and a supplemental channel. The fundamental channel is continuously transmitted from all base stations in the active set. The supplemental channel is transmitted from the same base stations as the fundamental channel or a subset thereof. The invention described herein can be applied to the fundamental channel, the supplemental channel or both.

Figure 9:
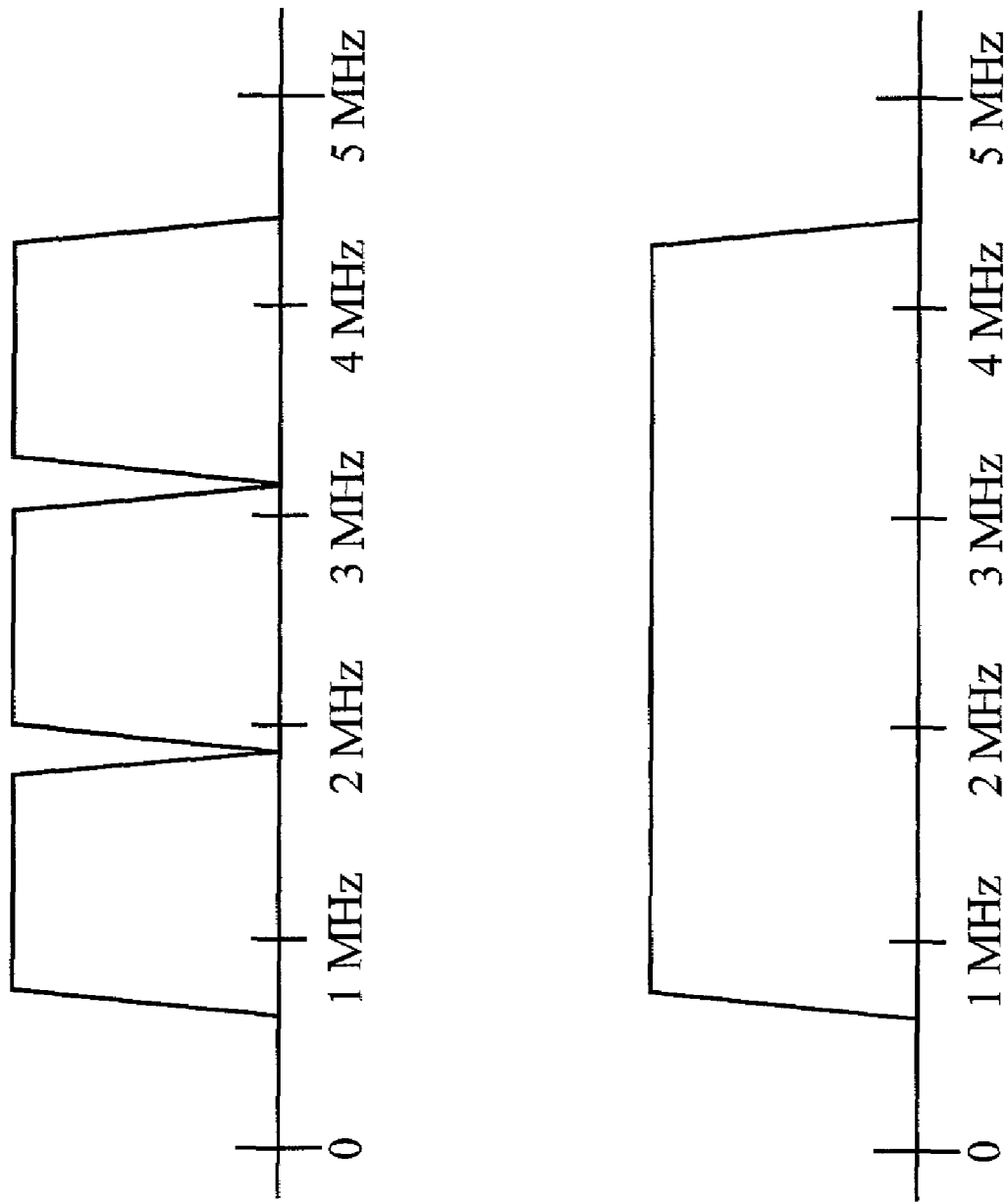
FIG. 9 is a diagram of a multi-carrier forward link.

FIG. 9 is a spectrum diagram of a multi-carrier spread spectrum forward link and a single carrier wide-band spread spectrum link. Although not shown completely to scale, for the multi-carrier approach, the spreading bandwidth for each carrier is shown as 1.25 MHz, and for the single carrier wide-band approach the spreading bandwidth is 3.6864

MHz. The multi-carrier approach has various advantages including allowing each carrier to be transmitted from a differently configured antenna, which in turn provides a unique fading pattern for each carrier decreasing the likelihood of all three carriers fading simultaneously, and therefore of communications from being disrupted.

Figure 10:
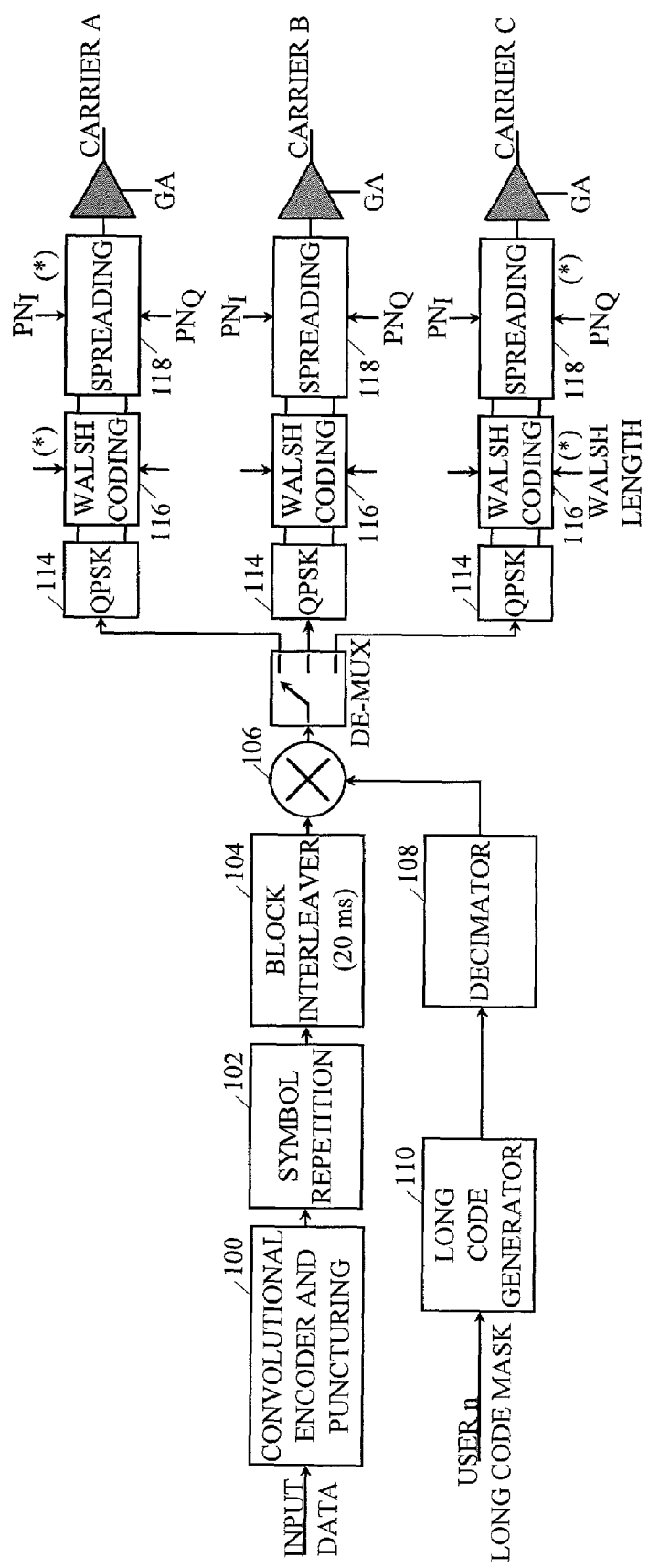
FIG. 10 is a block diagram of a multi-carrier forward link transmitter.

FIG. 10 is a block diagram of a multi-carrier transmit system configured in accordance with one embodiment of the invention. Input data is convolutionally encoded and punctured by conventional encoder 100, and the encoded symbols are repeated by symbol repeater 102 to add additional redundancy. Block interleaver 104 block interleaves the repeated symbols in 20 ms time intervals and the interleaved symbols are scrambled via XOR 106 with a decimated long code generated by long code generator 110 and decimator 108 in response to a user long code mask. The scrambled symbols are demultiplexed by demux 112 into three symbol streams that are each transmitted over a respective carrier signal.

For each carrier signal, the respective symbol streams are QPSK mapped by QPSK mappers 114. The QPSK symbols are each modulated with the same Walsh channel code by Walsh code modulators 116 and the resulting Walsh chips are further modulated by with an in-phase spreading code $PN_I$ and a quadrature-phase spreading code $PN_Q$ by spreaders 118. $PN_I$ and $PN_Q$ are preferably the same for each carrier. The resulting spread symbols are then each upconverted to a unique carrier frequency, preferably as shown in FIG. 9, and transmitted. FIG. 10 shows modulation by the same Walsh channel code for each carrier; however, the Walsh channel code may be different.

Figure 11:
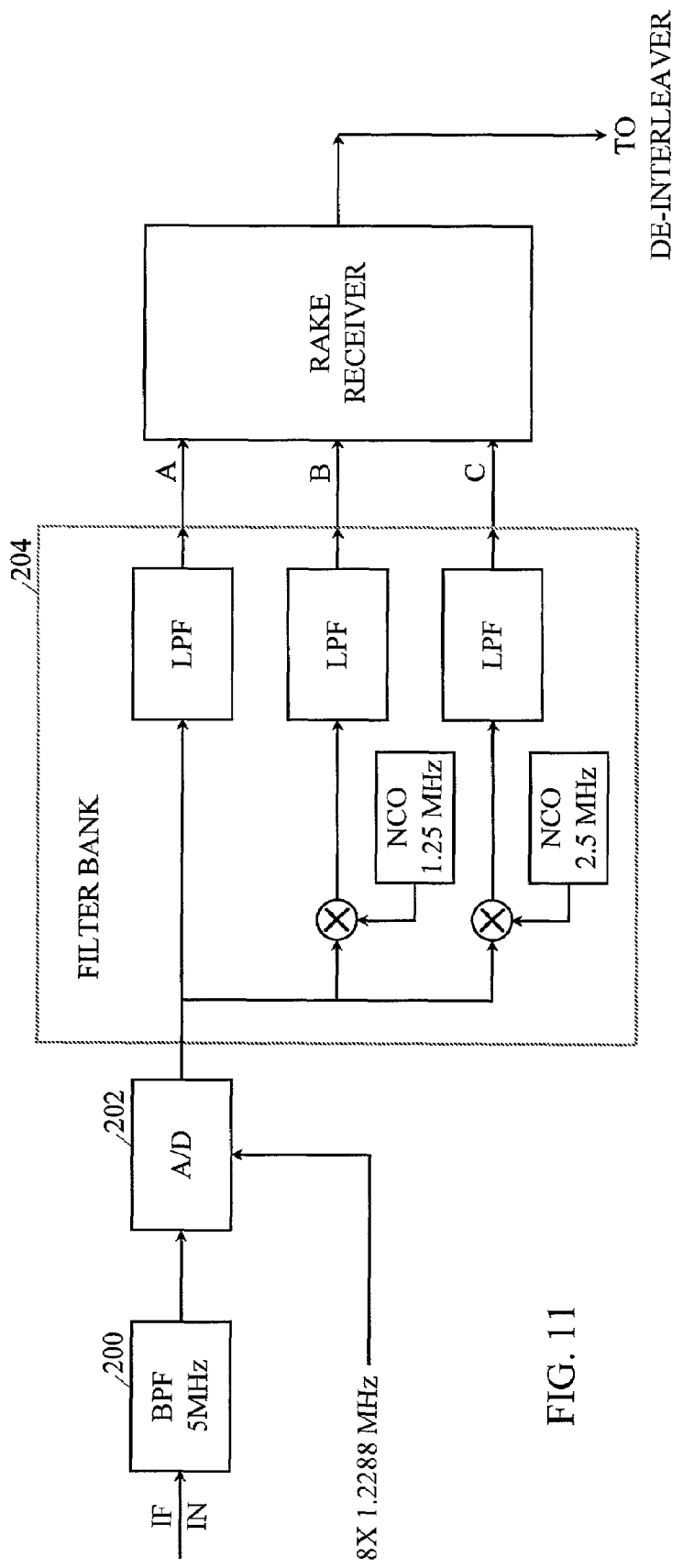
FIG. 11 is a block diagram of a multi-carrier forward link receiver.

FIG. 11, is a block diagram of a portion of a receive system employed by a mobile unit to process a multi-carrier signal when configured in accordance with one embodiment of the invention. Downconverted RF energy is bandpass filtered to 5 MHz by bandpass filter 200 and sampled by A/D 202 at a rate of 8×1.2288 MHz. Within filter bank 204, two 1.25 MHz portions of the samples are further downconverted digitally to baseband by a 1.2 MHz numerically controlled oscillator (NCO), or optionally by a 1.25 MHz NCO and a 2.5 Mhz NCO, and the three sets of samples are lowpass filtered to a 1.25 MHz bandwidth. This lowpass filter can be the receiver's matched filter or a part thereof. The resulting sets of lowpass filtered data is passed to rake receiver 210, which demodulates and combines the various multipath instances of the transmitted signal. The resulting combined soft decision data is passed on to a deinterleaver for deinterleaving and then decoding.

Obviously, numerous modifications and variations of the present invention are possible in light of the above teachings. It is therefore to be understood that within the scope of the appended claims, the invention may be practiced otherwise than as specifically described herein.

What is claimed is:

1. A method for a communications system, comprising the steps of:
   identifying a plurality of base stations in an Active set of a mobile station in a handoff process among said plurality of base stations;
   measuring at said mobile station respective signal qualities of pilots respectively transmitted by said base stations in said Active set of said mobile station;
   comparing said respective signal qualities of said pilots to a standard, said standard determined in response to signal quality of at least one of said pilots in said active set and a delta value of signal quality, wherein said delta value is a representative of a fixed signal level below a strongest pilot signal level of said pilots;
   determining which of said base stations are to transmit respective code channels to said mobile station and which are not to transmit respective code channels to said mobile station based on whether which of said pilots at said mobile station equal or surpass said standard in said handoff process among said plurality of base stations.

2. The method of claim 1, wherein said measuring step comprises measuring signal qualities of pilots respectively transmitted by at least one sector of a respective one of said plurality of base stations in said Active set.

3. The method of claim 1, wherein said comparing step comprises determining whether at least one finger of a diversity receiver has been allocated to a code channel signal from a base station.

4. The method of claim 1 wherein said pilots are transmitted over a plurality of carrier signals.

5. The method of claim 4 wherein said plurality of carrier signals are transmitted from a corresponding plurality of differently configured antennas.

6. An apparatus for a communications system, comprising:
   means for identifying a plurality of base stations in an Active set of a mobile station in a handoff process among said plurality of base stations;
   means for measuring at said mobile station respective signal qualities of pilots respectively transmitted by said base stations in said Active set of said mobile station;
   means for comparing said respective signal qualities of said pilots to a standard, said standard determined in response to said signal quality of at least one of said pilots in said active set and a delta value of signal quality, wherein said delta value is a representative of a fixed signal level below a strongest pilot signal level of said pilots;
   means for determining which of said base stations are to transmit respective code channels to said mobile station and which are not to transmit respective code channels to said mobile station based on whether which of said pilots at said mobile station equal or surpass said standard in said handoff process among said plurality of base stations.

7. The apparatus of claim 6, wherein said measuring means comprises means for measuring signal qualities of pilots respectively transmitted by at least one sector of a respective one of said plurality of base stations in said Active set.

8. The apparatus of claim 6, wherein said comparing means comprises means for determining whether at least one finger of a diversity receiver has been allocated to a code channel signal from a base station.

9. The apparatus of claim 6 further comprising means for transmitting said pilots over a plurality of carrier signals.

10. The apparatus of claim 9 wherein said means for transmitting said plurality of carrier signals includes means for transmitting said plurality of carrier signals from a conesponding plurality of differently configured means for antennas.

* * * * *